(12) United States Patent
Boyer et al.

(10) Patent No.: US 12,063,243 B2
(45) Date of Patent: Aug. 13, 2024

(54) AUTONOMOUS EMAIL REPORT GENERATOR

(71) Applicant: Darktrace Limited, Cambridge (GB)

(72) Inventors: John Anthony Boyer, Cambridge (GB); Dickon Humphrey, Cambridge (GB); Matthew Dunn, Ely (GB)

(73) Assignee: Darktrace Holdings Limited, Cambridge (GB)

( * ) Notice: Subject to any disclaimer, the term of this patent is extended or adjusted under 35 U.S.C. 154(b) by 189 days.

(21) Appl. No.: 16/941,878

(22) Filed: Jul. 29, 2020

(65) Prior Publication Data

US 2023/0308472 A1 Sep. 28, 2023

Related U.S. Application Data

(63) Continuation-in-part of application No. 16/278,932, filed on Feb. 19, 2019, now Pat. No. 11,606,373, and
(Continued)

(51) Int. Cl.
*H04L 9/40* (2022.01)
*G06F 3/04847* (2022.01)
(Continued)

(52) U.S. Cl.
CPC ...... *H04L 63/1441* (2013.01); *G06F 3/04847* (2013.01); *G06F 40/103* (2020.01);
(Continued)

(58) Field of Classification Search
None
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Michael W Chao
(74) *Attorney, Agent, or Firm* — Rutan and Tucker, LLP

(57) ABSTRACT

An autonomous email-report composer composes a type of report on cyber threats that is composed in a human-readable format with natural language prose, terminology, and level of detail on the cyber threats aimed at a target audience. The autonomous email-report composer cooperates with libraries with prewritten text templates with i) standard pre-written sentences written in the natural language prose and ii) prewritten text templates with fillable blanks that are populated with data for the cyber threats specific for a current report being composed, where a template for the type of report contains two or more sections in that template. Each section having different standard pre-written sentences written in the natural language prose.

20 Claims, 18 Drawing Sheets

The intent summary categorises all potentially malicious emails seen in the last seven days by their derived purpose.

Related U.S. Application Data a continuation-in-part of application No. 16/279,022, filed on Feb. 19, 2019, now Pat. No. 11,689,557.

(60) Provisional application No. 62/880,450, filed on Jul. 30, 2019, provisional application No. 62/632,623, filed on Feb. 20, 2018.

(51) Int. Cl.
- *G06F 40/103* (2020.01)
- *G06F 40/174* (2020.01)
- *G06F 40/186* (2020.01)
- *G06F 40/40* (2020.01)

(52) U.S. Cl.
CPC .......... *G06F 40/174* (2020.01); *G06F 40/186* (2020.01); *G06F 40/40* (2020.01); *H04L 63/1416* (2013.01); *H04L 63/1425* (2013.01)

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 7,890,869 B1 | 2/2011 | Mayer et al. | |
| 8,312,540 B1 | 11/2012 | Kahn et al. | |
| 8,661,538 B2 | 2/2014 | Cohen-Ganor et al. | |
| 8,819,803 B1 | 8/2014 | Richards et al. | |
| 8,879,803 B2 | 11/2014 | Ukil et al. | |
| 8,903,920 B1 | 12/2014 | Hodgson | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,348,742 B1 | 5/2016 | Brezinski | |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,641,544 B1 | 5/2017 | Treat et al. | |
| 9,712,548 B2 | 7/2017 | Shmueli et al. | |
| 9,727,723 B1 | 8/2017 | Kondaveeti et al. | |
| 9,773,112 B1 | 9/2017 | Rathor et al. | |
| 10,031,646 B2* | 7/2018 | Pearcy | G06F 3/0484 |
| 10,237,298 B1 | 3/2019 | Nguyen et al. | |
| 10,268,821 B2 | 4/2019 | Stockdale et al. | |
| 10,419,466 B2 | 9/2019 | Ferguson et al. | |
| 10,516,693 B2 | 12/2019 | Stockdale et al. | |
| 10,581,886 B1* | 3/2020 | Sharifi Mehr | H04L 63/1441 |
| 10,701,093 B2 | 6/2020 | Dean et al. | |
| 10,764,313 B1* | 9/2020 | Mushtaq | G06N 20/00 |
| 10,936,643 B1* | 3/2021 | Alspaugh | G06F 16/951 |
| 10,956,655 B2* | 3/2021 | Choe | G06F 40/131 |
| 11,089,047 B1* | 8/2021 | Kaushal | H04L 67/10 |
| 11,128,649 B1* | 9/2021 | Yeh | H04L 63/1483 |
| 11,295,274 B1* | 4/2022 | Ghasem Khan Ghajar | G06F 9/547 |
| 11,750,631 B2* | 9/2023 | Crabtree | H04L 63/1433 726/25 |
| 11,775,622 B2* | 10/2023 | Zhan | G06F 21/316 726/2 |
| 11,934,290 B2* | 3/2024 | Wang | G06F 40/186 |
| 2002/0174217 A1 | 11/2002 | Anderson et al. | |
| 2002/0186698 A1 | 12/2002 | Ceniza | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2005/0257267 A1* | 11/2005 | Williams | H04L 63/1408 726/25 |
| 2007/0118909 A1 | 5/2007 | Hertzog et al. | |
| 2007/0129893 A1* | 6/2007 | McColl | G06Q 10/00 702/19 |
| 2007/0169021 A1* | 7/2007 | Huynh | G16H 15/00 717/136 |
| 2007/0222589 A1* | 9/2007 | Gorman | G06Q 10/00 709/223 |
| 2007/0234426 A1* | 10/2007 | Khanolkar | H04L 63/1408 726/23 |
| 2007/0266138 A1* | 11/2007 | Spire | H04L 63/1416 709/223 |
| 2007/0294187 A1 | 12/2007 | Scherrer | |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0043066 A1 | 2/2010 | Miliefsky | |
| 2010/0095374 A1 | 4/2010 | Gillum et al. | |
| 2010/0107254 A1 | 4/2010 | Elland et al. | |
| 2010/0121929 A1 | 5/2010 | Lin | |
| 2010/0125908 A1 | 5/2010 | Kudo | |
| 2010/0235908 A1 | 9/2010 | Eynon et al. | |
| 2010/0274596 A1* | 10/2010 | Grace | G06Q 10/10 705/7.15 |
| 2010/0274616 A1* | 10/2010 | Grace | G06Q 10/063 705/7.11 |
| 2010/0287246 A1 | 11/2010 | Klos et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0055399 A1* | 2/2013 | Zaitsev | H04L 63/0263 726/25 |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0212692 A1* | 8/2013 | Sher-Jan | G06F 21/6245 726/26 |
| 2013/0254885 A1 | 9/2013 | Devost | |
| 2014/0007237 A1 | 1/2014 | Wright et al. | |
| 2014/0052480 A1* | 2/2014 | Bell | G06Q 40/08 705/4 |
| 2014/0074762 A1 | 3/2014 | Campbell | |
| 2014/0149107 A1* | 5/2014 | Schilder | G06F 40/56 704/9 |
| 2014/0165207 A1 | 6/2014 | Engel et al. | |
| 2014/0215618 A1 | 7/2014 | Amit | |
| 2014/0279352 A1* | 9/2014 | Schaefer | G06Q 40/04 705/37 |
| 2014/0283048 A1* | 9/2014 | Howes | G06F 16/367 707/739 |
| 2014/0325643 A1 | 10/2014 | Bart et al. | |
| 2015/0019662 A1* | 1/2015 | O'Kane | G06F 40/186 709/206 |
| 2015/0067835 A1 | 3/2015 | Chari et al. | |
| 2015/0081431 A1 | 3/2015 | Akahoshi et al. | |
| 2015/0120359 A1* | 4/2015 | Dongieux | G06F 16/285 705/7.15 |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0180893 A1 | 6/2015 | Im et al. | |
| 2015/0213358 A1 | 7/2015 | Shelton et al. | |
| 2015/0227508 A1* | 8/2015 | Howald | G06F 40/30 704/9 |
| 2015/0261745 A1* | 9/2015 | Song | G06F 40/56 704/9 |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1 | 11/2015 | Lefebvre et al. | |
| 2015/0363699 A1 | 12/2015 | Nikovski | |
| 2015/0379110 A1 | 12/2015 | Marvasti et al. | |

(56) References Cited

U.S. PATENT DOCUMENTS

| | | | |
|---|---|---|---|
| 2016/0027125 A1* | 1/2016 | Bryce | G06Q 40/12 705/30 |
| 2016/0062950 A1 | 3/2016 | Brodersen et al. | |
| 2016/0078365 A1 | 3/2016 | Baumard | |
| 2016/0149941 A1 | 5/2016 | Thakur et al. | |
| 2016/0164902 A1 | 6/2016 | Moore | |
| 2016/0173509 A1 | 6/2016 | Ray et al. | |
| 2016/0212166 A1* | 7/2016 | Henry | G06F 21/604 |
| 2016/0219048 A1* | 7/2016 | Porras | H04L 41/40 |
| 2016/0241576 A1 | 8/2016 | Rathod et al. | |
| 2016/0241581 A1 | 8/2016 | Watters | |
| 2016/0301705 A1* | 10/2016 | Higbee | H04L 63/20 |
| 2016/0352768 A1 | 12/2016 | Lefebvre et al. | |
| 2016/0359695 A1 | 12/2016 | Yadav et al. | |
| 2016/0373476 A1 | 12/2016 | Dell'Anno et al. | |
| 2017/0048261 A1 | 2/2017 | Gmach et al. | |
| 2017/0054745 A1 | 2/2017 | Zhang et al. | |
| 2017/0063907 A1 | 3/2017 | Muddu et al. | |
| 2017/0063910 A1* | 3/2017 | Muddu | G06F 3/0482 |
| 2017/0063911 A1 | 3/2017 | Muddu et al. | |
| 2017/0140010 A1* | 5/2017 | Agarwal | G06Q 10/0633 |
| 2017/0169360 A1 | 6/2017 | Veeramachaneni et al. | |
| 2017/0220801 A1 | 8/2017 | Stockdale et al. | |
| 2017/0230391 A1 | 8/2017 | Ferguson et al. | |
| 2017/0230392 A1 | 8/2017 | Stockdale | |
| 2017/0235723 A1* | 8/2017 | Allen | G06F 40/10 704/9 |
| 2017/0244736 A1 | 8/2017 | Benishti et al. | |
| 2017/0251012 A1 | 8/2017 | Stockdale et al. | |
| 2017/0270422 A1 | 9/2017 | Sorakado | |
| 2017/0323327 A1* | 11/2017 | Pachisia | G06Q 30/0244 |
| 2017/0353477 A1* | 12/2017 | Faigon | G06F 21/554 |
| 2018/0027006 A1 | 1/2018 | Zimmermann et al. | |
| 2018/0034840 A1* | 2/2018 | Marquardt | G06N 7/01 |
| 2018/0167402 A1 | 6/2018 | Scheidler et al. | |
| 2018/0191771 A1* | 7/2018 | Newman | H04L 63/20 |
| 2018/0322292 A1* | 11/2018 | Tedeschi | H04L 63/1433 |
| 2018/0367549 A1* | 12/2018 | Jang | G06N 5/022 |
| 2019/0036948 A1 | 1/2019 | Appel et al. | |
| 2019/0044963 A1 | 2/2019 | Rajasekharan et al. | |
| 2019/0098037 A1* | 3/2019 | Shenoy, Jr. | H04L 63/1441 |
| 2019/0238571 A1 | 8/2019 | Adir et al. | |
| 2019/0251260 A1 | 8/2019 | Stockdale et al. | |
| 2020/0244673 A1 | 7/2020 | Stockdale | |
| 2020/0280575 A1 | 9/2020 | Dean et al. | |
| 2021/0120027 A1 | 4/2021 | Dean et al. | |
| 2021/0152575 A1* | 5/2021 | Mistry | H04L 63/1425 |
| 2021/0157919 A1 | 5/2021 | Stockdale et al. | |
| 2021/0273958 A1 | 9/2021 | McLean | |
| 2021/0320871 A1* | 10/2021 | Savarese | H04L 47/20 |
| 2023/0300165 A1* | 9/2023 | Fricano | H04L 63/20 726/25 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts, " Lecture Notes in Computer Science, 2012, vol. 7465, Springer, Berlin, Heidelberg, Germany.

United States Patent and Trademark Office, Non-Final Office Action, Jun. 14, 2021.

United States Patent and Trademark Office, Non-Final Office Action, Aug. 17, 2022.

United States Patent and Trademark Office, Final Office Action, Feb. 18, 2022.

Saar Cohen et al., "Spectral Bloom Filters," 2003, pp. 1-12, as printed.

Shih DH et al., "Classification methods in the detection of new malicious emails", Information Sciences, Jun. 9, 2005, pp. 241-261, vol. 172, No. 1-2, Amsterdam, NL.

Japanese Patent and Trademark Office, Notice of Reasons of Refusal, Oct. 5, 2022, 5 pages.

Extended European Search Report for Application No. EP19158046.3, Jul. 11, 2019, 9 pages.

United States Patent and Trademark Office, Non-Final Office Action, Jun. 23, 2020, 26 pages.

United States Patent and Trademark Office, Final Office Action, Dec. 8, 2021, 37 pages.

* cited by examiner

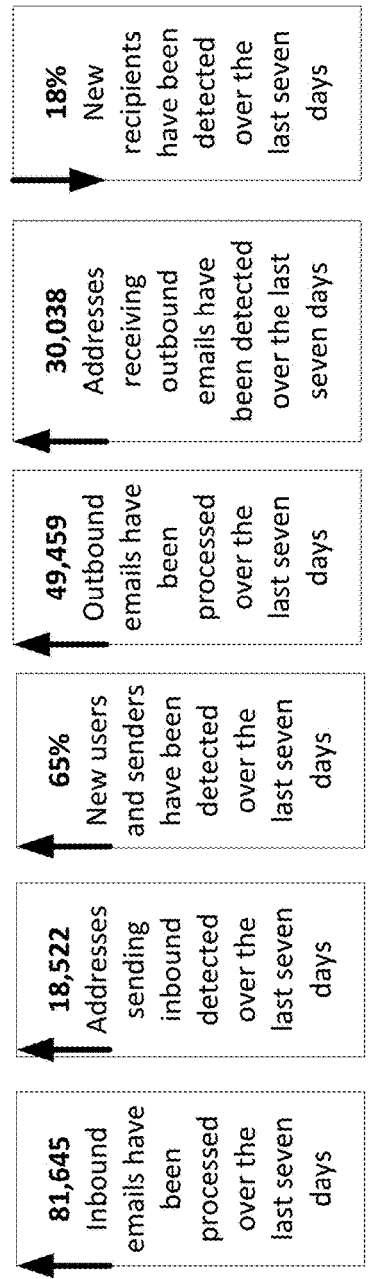
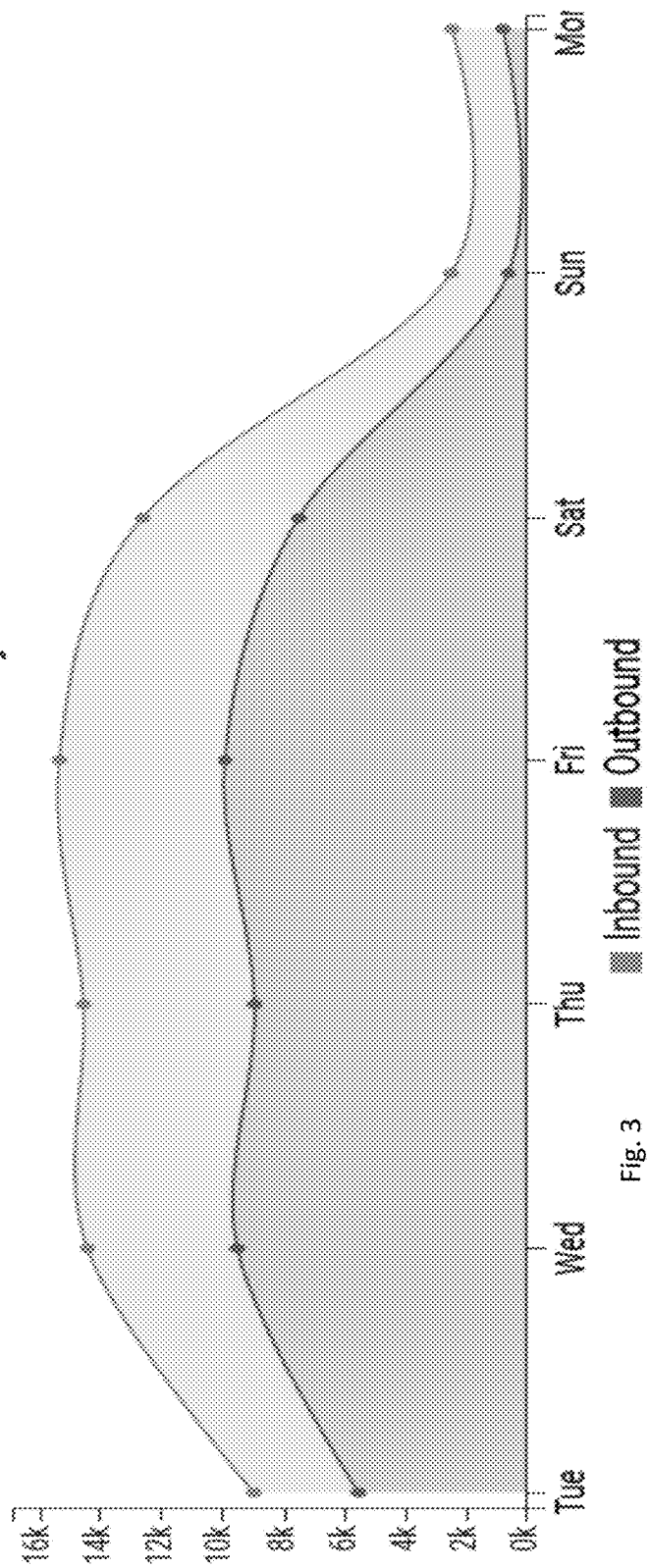
Fig. 3

Link new correspondent rare link     UUID: 922E6673-3AFE-4A85-B045-4ADE105A8245.1

| | |
|---|---|
| From: | Joshua Wilson city bank treasury <joshua_Wilson@banktech2.ru> |
| To: | Mason.williamson@holdingsinc.com |
| Date: | 2019-12-17 05:48:51 UTC |
| Subject: | Please review transfer of funds |
| Microsoft Action: | Delivered |
| Payload: | http://xiamdmisk[.]com/universal/index[.]php |
| Display Text: | Please Click Here |
| Payload Action: | Double Lock Link    Antigena Action: Hold Message    Similar emails: 5 |

AUTONOMOUS EMAIL REPORT GENERATOR

RELATED APPLICATIONS

This application claims priority to and the benefit of under 35 USC 119 of U.S. provisional patent application titled "A cyber security system with enhancements," filed Jul. 30, 2019, Ser. No. 62/880,450, which is incorporated herein by reference in its entirety. In addition, this application claims priority to and the benefit as a continuation-in-part application of under 35 USC 120 of U.S. patent application titled "Autonomous Report Composer," filed Feb. 19, 2019, Ser. No. 16/279,022, which claimed priority to and the benefit of under 35 USC 119 of U.S. provisional patent application titled "A email protection system with various improvements," filed Feb. 20, 2018, Ser. No. 62/632,623. In addition, this application claims priority to and the benefit as a continuation-in-part application of under 35 USC 120 of U.S. patent application titled "A Cyber Threat Defense System protecting email networks with machine learning models," filed Feb. 19, 2019, Ser. No. 16/278,932, which claimed priority to and the benefit of under 35 USC 119 of U.S. provisional patent application titled "A email protection system with various improvements," filed Feb. 20, 2018, Ser. No. 62/632,623. All of the above applications are incorporated by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to an email protection system. In an embodiment, Artificial Intelligence (AI) is applied to analyzing cyber security threats, where the AI does the analysis to assess cyber threats to the system.

BACKGROUND

Email security has not traditionally been seen as needing a full write-up or proper analysis reporting, a list of bad emails was previously sufficient. Lots of man-hours could be spent drafting security and threat intelligence information for professionals interested in the state of cyber security.

SUMMARY

In an embodiment, an email protection system protects a system, including but not limited to an email network, from cyber threats. An autonomous email-report composer can cooperate with at least various Artificial Intelligence models and modules of an email protection system as well as a set of one or more libraries of sets of prewritten text and visual representations to populate on templates of pages in an email threat report. The autonomous email-report composer can compose the email threat report on cyber threats in a human-readable format with natural language prose, terminology, and level of detail on cyber threats aimed at a target audience being able to understand the terminology and the level of detail. The autonomous email-report composer can cooperate with the one or more libraries of sets of prewritten text templates and visual representation templates with i) one or more standard pre-written sentences written in the natural language prose derived from previously generated email threat reports as well as ii) one or more of the prewritten text templates with fillable blanks that are populated with data for the cyber threats, specific for a current email threat report being composed with detailed information about an email pattern of life for entities in an email network, during a period of time covered by the current email threat report. The autonomous email-report composer can cooperate with one or more Artificial Intelligence models trained with machine learning on a normal email pattern of life for the entities in the email network and a data store to compose content in the email threat report. The formatting module can format, present, and output the current email threat report, from a template of a plurality of report templates, that is outputted for a human user's consumption in a medium of any of 1) a printable report, 2) presented digitally on a user interface on a display screen, 3) in a machine readable format for further use in machine-learning reinforcement and refinement, and 4) any combination of the three.

These and other features of the design provided herein can be better understood with reference to the drawings, description, and claims, all of which form the disclosure of this patent application.

DRAWINGS

The drawings refer to some embodiments of the design provided herein in which:

FIG. 3 illustrates a diagram of an embodiment of an example email threat report generated by the autonomous email-report composer showing a summary of email activity in the email network.

FIG. 6 illustrates a diagram of an embodiment of an example email threat report generated by the autonomous email-report composer showing selected interesting email incidents on a page of the email threat report.

Figure 1:
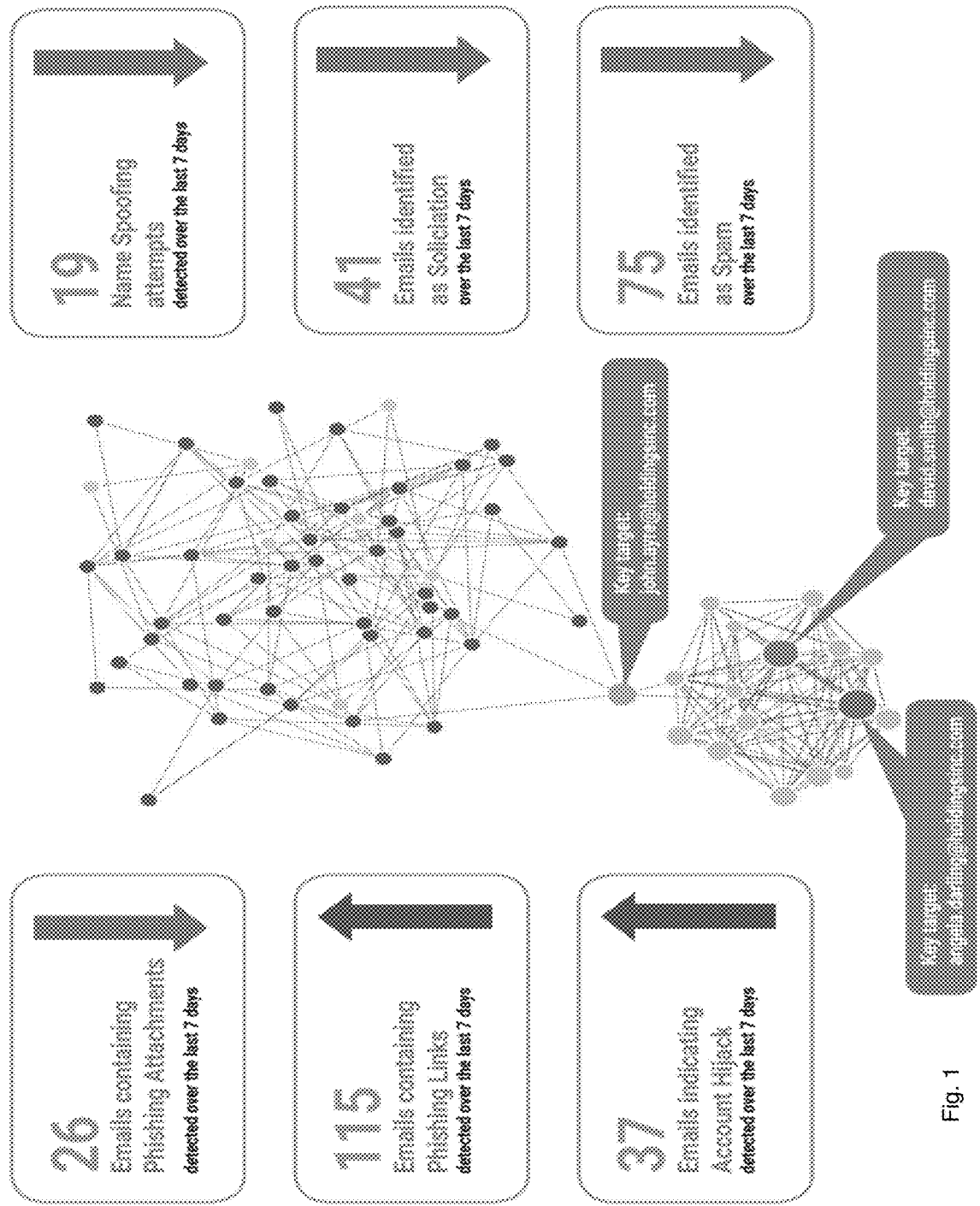
FIG. 1 illustrates a diagram of an embodiment of an example email threat report generated by the autonomous email report generator showing a summary of email attacks and at risk users.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Both an email protection system as well as an email threat report on cyber threats generated by the autonomous email-report composer in the email protection system are discussed.

In general, when the email protection system sees something abnormal or suspicious involving the email system, then the email protection system forms one or more hypotheses on what are the possibilities to cause this abnormal behavior or suspicious activity. Next, the email protection system then finds evidence/collects data to support or refute each possible hypothesis, assigns a threat level and an optional probability, and then generates a formal report.

With the real time speed of attacks and almost overwhelming volume of data within an email system, this task of examining suspicious activities and/or abnormal behavior is very difficult for a human analyst to keep up with or perform; and thus, early detection of cyber threats may not occur until after the cyber threat has already caused significant harm. In addition, other individuals in an organization need to be intelligently informed on what is happening in their email system but in manner that is comprehensive but not overwhelming.

FIGS. 1-10 show example pages of an example email threat report generated by the autonomous email-report composer cooperating with the modules, AI models, and libraries of the email protection system. FIGS. 11-17 show an example implementation of the email protection system.

FIG. 1 illustrates a diagram of an embodiment of the email threat report generated by the autonomous email report generator showing a summary of email attacks and at risk users. The autonomous email-report composer generates an email threat report and populates the multiple pages of the email threat report. The autonomous email-report composer can create high-level reports for a target audience, such as an executive audience, which display detailed information about the email pattern of life for the organization, selected email attack incidents and/or campaigns of greatest interest, as well as actionable information about users who are most at risk. The automatic email thread report generator summarizes email activity and threats over a specified duration of time for the email threat report, such as a week duration, in the email protection system 100. The generated report is supposed to give an overview of what's happening in the e-mail network as well as highlight specific incidents of emails of high value or interest. Also, the generated report indicates autonomous actions being taken by the email security system on emails in general and particular emails of interest on an individual basis in context of how many emails overall are coming into the email system in that duration of the report.

The autonomous email-report composer can compose the email threat report on cyber threats, which is composed in a human-readable format with natural language prose, terminology, and level of detail on the cyber threats aimed at a target audience being able to understand the terminology and the detail.

The autonomous email-report composer in the pages provides a full write up of the email pattern-of-life, specific incidents triaged with details of the resolution taken, and can be shown in a visually engaging way with visual representations that include i) graphs, ii) contact links to a user, iii) pie charts, iv) bar charts, v) bubbles, and vi) any combination of these, along with some text and fields without being too long or requiring end-user time to create. The autonomous email-report composer attempts to represent the subject of complex metrics in a visually engaging way with graphs, pie charts, bar charts, bubbles, etc. whilst also demonstrating a depth of analysis and targets in the email protection system 100.

Referring to FIG. 1, the autonomous email-report composer composes an email threat report and populates pages of the email threat report with a summary on types of attacks occurring through the email system. For example, the populated data on the page can be types of attacks detected, such as 26 emails containing phishing attachments detected over the last 7 days, 115 emails containing phishing links detected over the last 7 days, 37 emails indicating account hijacking detected over the last 7 days; 19 name spoofing attempts detected over the last 7 days; 41 emails identified as solicitation over the last 7 days; and 75 emails identified as spam over the last 7 days.

Figure 2:
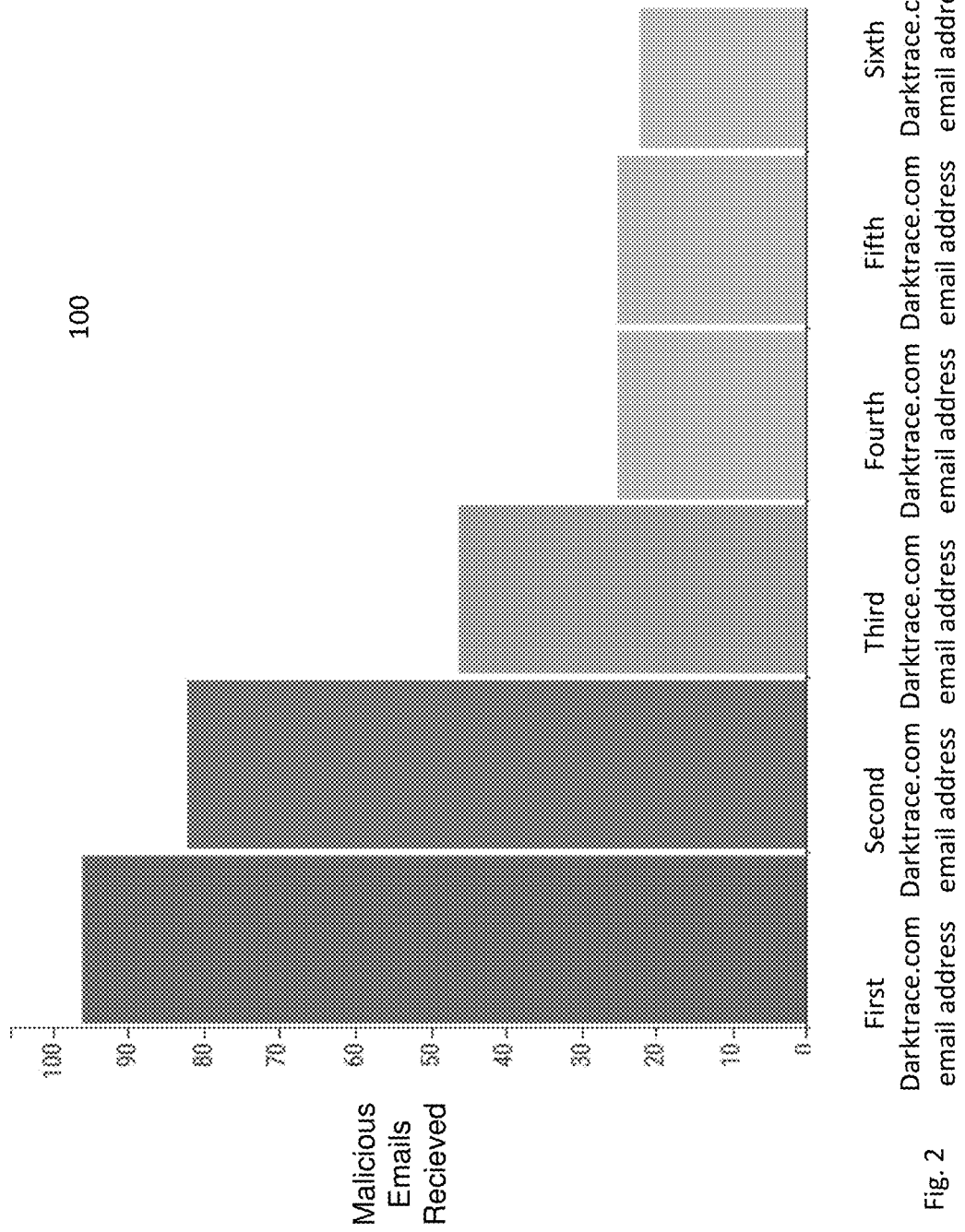
FIG. 2 illustrates a diagram of an embodiment of an example email threat report generated by the autonomous email-report composer showing another potential vulnerability of the email system, such as data loss via the email network.

FIG. 2 illustrates a diagram of an embodiment of the email threat report generated by the autonomous email-report composer showing another potential vulnerability of the email system, such as data loss via the email network. For example, the populated data on the page can be potential data exfiltration shown in bar graphs accompanied by a list of users most at risk. The populated data on the page can show users that were observed sending unique or rare attachments/files that 1) have been observed infrequently by the email protection system 100 in either inbound or outbound communications, and 2) have an external email alias that may represent a user's personal email address or an on-line data storage website. These email incidents can be indicative of data-loss.

An anomalous email is that which is detected as outside the usual pattern of life for the user and exhibits traits that may suggest a malicious intent. The following users receive the most email of this kind in the last seven days. For each user, the number of malicious emails is included alongside the number of malicious links observed. A bar graph of six email addresses and a graphic of the six email addresses should be displayed in email threat report generated by the autonomous email-report composer. The graphic of the six email addresses that should be displayed in email threat report would indicate as follows. A first Darktrace.com email address received 96 malicious emails with 105 malicious links observed. A second Darktrace.com email address received 82 malicious emails with 372 malicious links observed. A third email Darktrace.com address received 46 malicious emails with 339 malicious links observed. A fourth email Darktrace.com address received 25 malicious emails with 119 malicious links observed. A fifth email Darktrace.com address received 25 malicious emails with 126 malicious links observed. A sixth email Darktrace.com email address received 22 malicious emails with 108 malicious links observed.

FIG. 3 illustrates a diagram of an embodiment of the email threat report generated by the autonomous email-report composer showing a summary of email activity in the email network. The autonomous email-report composer can generate a summary of the email protection system's 100 deployment status on the email network over a given time period, such as the last seven days. The email threat report covers the email activity observed by the email protection system 100 and the potential vulnerabilities found. For example, the summary populated on the page could convey 81,645 inbound emails processed over the last 7 days; 18,522 different email addresses have been sent inbound mails over the last 7 days; 65% of new senders have sent inbound mails over the last 7 days; 49,459 outbound emails have been sent over the last 7 days; etc. The autonomous email-report composer can also plot a graph of the email flow.

The page in the email threat report generated by the autonomous email-report composer could state "The following is a summary of the email protection system deployment status on your network over the last seven days. The report covers the email activity observed by Antigena Email and the potential vulnerabilities found. The trend arrows shown on FIG. 3 will indicate whether a particular type of activity has increased decreased or remain the same constant compared with the previous seven days."

Figure 4:
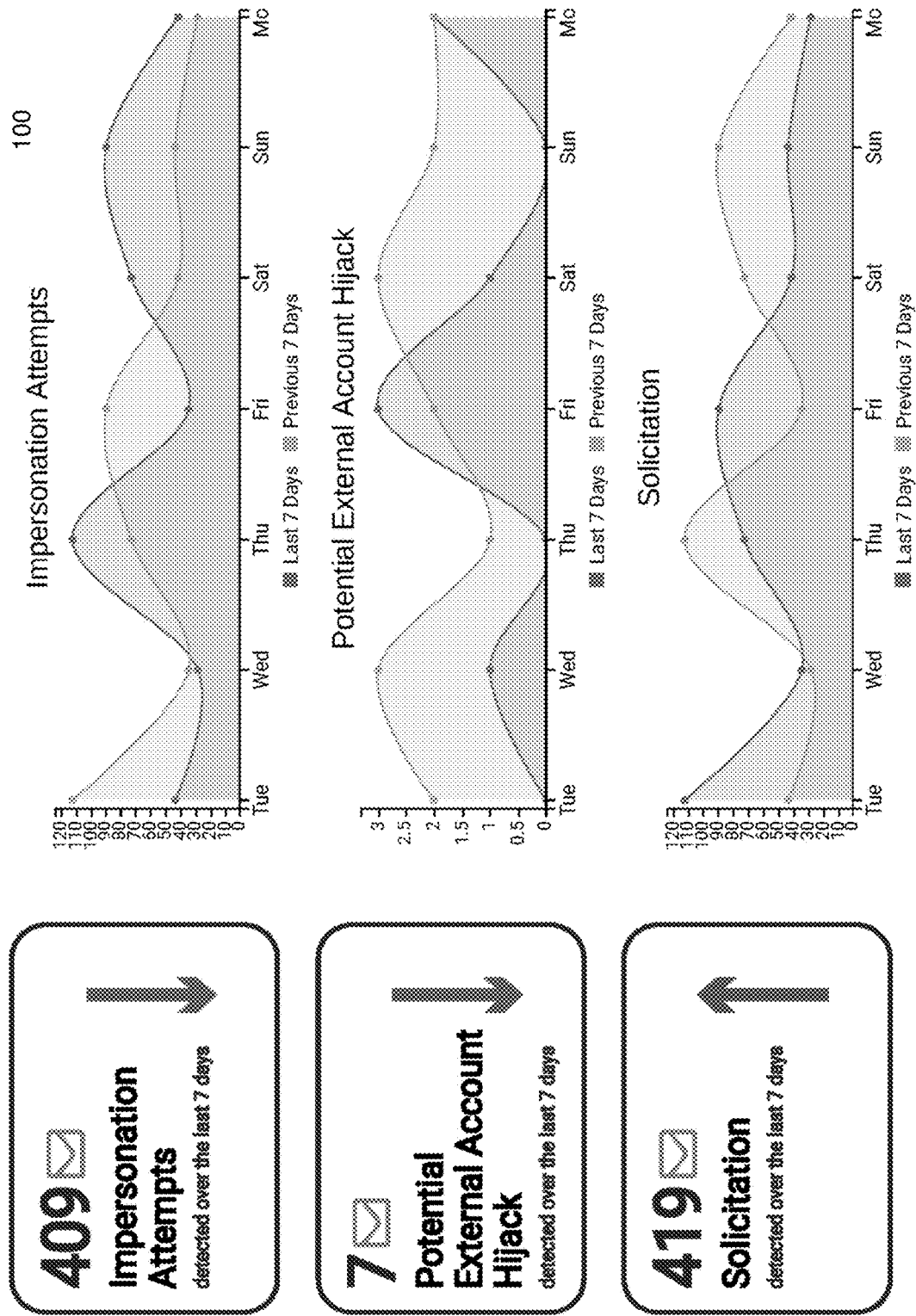
FIGS. 4-5 illustrate diagrams of an embodiment of an example email threat report generated by the autonomous email-report composer showing an intent, such as a purpose and/or targeted groups, of email attacks against the email system and its users.
Figure 5:
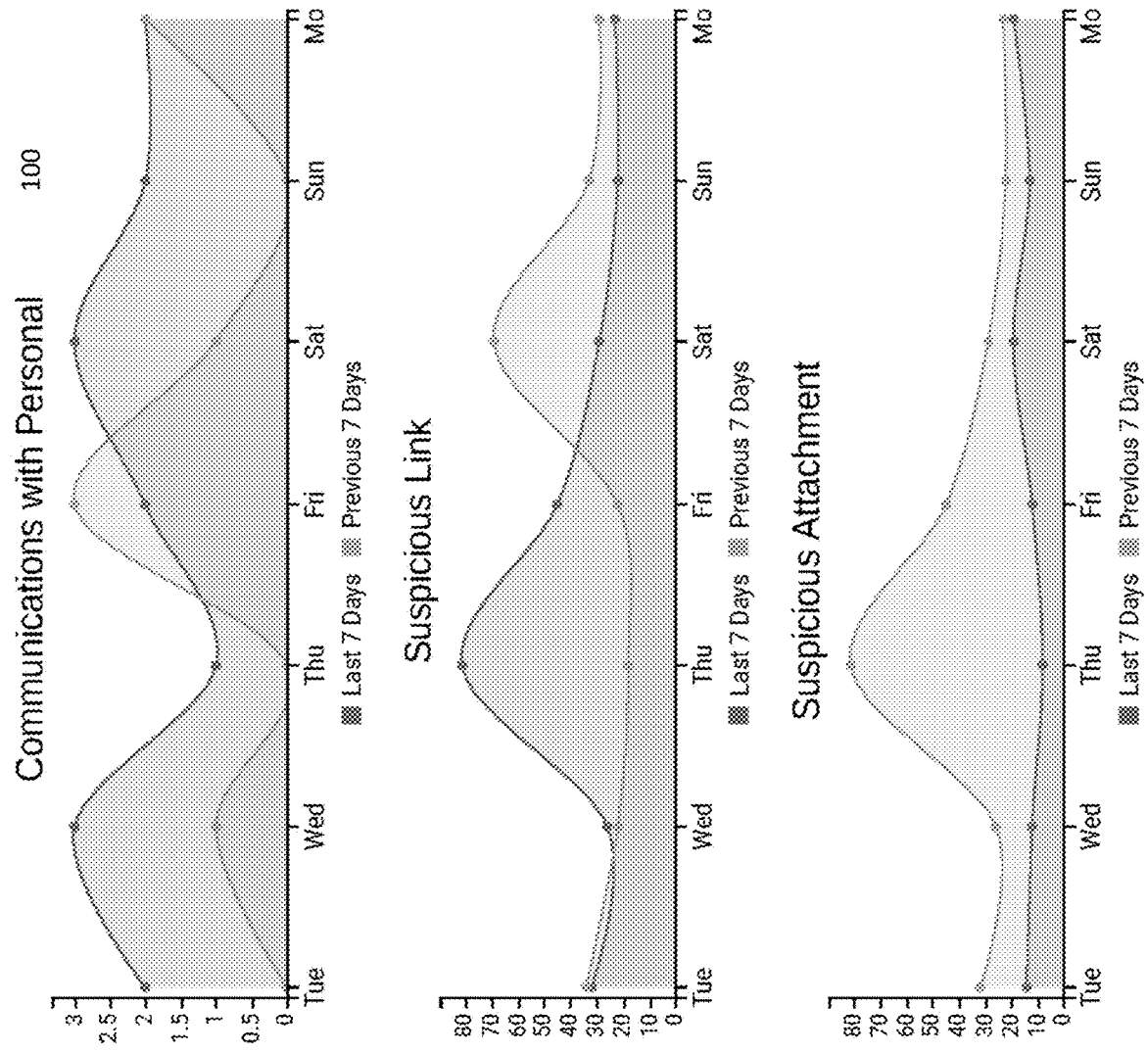

FIGS. 4-5 illustrate diagrams of an embodiment of the email threat report generated by the autonomous email-report composer showing an intent, such as a purpose and/or targeted group, of multiple email attacks against the email system and its users. For example, the populated data on the page can summarize categories of malicious emails and an intent of those attacks against the email system and its users. The categories of malicious emails seen in the last seven days are populated on the page by their derived purpose. The email threat report in these pages indicates the intent of an attack, for example, 1) a purpose, and/or 2) a targeted group, such as members of the finance team, high level employees, etc. For example, an intent of an attack may be impersonation of an internal employee for malicious purposes, of which 111 attempts were detected in the last 7 days, the potential hijack of an account belonging to a trusted service provider for fraudulent purposes, of which 61 attempts were detected over the last 7 days, 20 attempts to solicit unwanted business transactions, 493 attempts to perform link-based credential phishing detected over the last 7 days, 196 attempts to perform attachment-based credential phishing detected over the last 7 days, etc. All of this information may be shown as a graph or other visual representation on the page as well. The autonomous email-report composer can cooperate with the data store and the AI models trained on cyber threats to determine an intent of an email and insert that intent into the pages of the email threat report in the email protection system 100.

The autonomous email-report composer cooperating with the AI model trained on cyber threats can derive a purpose/ intent of an email by analyzing, for example, the content subject line, the content in a body of the email, etc.; as well as, metrics such as the 'send to' and 'received from' fields to see if they have been spoofed. Also, an AI classifier algorithm can augment other investigative tools to determine the nature of the link. An AI classifier algorithm for the autonomous email-report composer can create categories like fishing, spam, etc.

FIG. 6 illustrates a diagram of an embodiment of the email threat report generated by the autonomous email-report composer showing selected interesting email incidents on a page in the email threat report. The autonomous email-report composer on this page of the email threat report does not just list a series of emails that were prevented; but instead, the autonomous email-report composer and its algorithms select one or more most interesting email incidents for an individual write up. The autonomous email-report composer has a method to select the most interesting incidents from all known incidents by generating a score based on many factors. The autonomous email-report composer can also factor in selecting 'interesting' incidents autonomously through an analysis of a consistency and strength of the models of an incident triggered, the end-payload, the derived intent, and the users involved. Emails of interest can be selected with the assist of trained AI models.

The individual textual write up and visual representations for these most interesting email incidents can include details about the targeted user of the attack, the autonomous action taken by the autonomous response module, the characteristics of the derived attack type—like the payload/attachment-attack-type, phishing links, as well as the derived attack type (e.g. phishing, extortion, data loss, etc.). These interesting incidents convey a high-level triage with attack details, payload details, and potential intent of the attack. The threat intelligence included about each 'interesting' incident gives enough detail for a fuller investigation and the information on possible attack trends gives the human analyst an indication of where the attack may progress to. Anything that streamlines the workflow can be desirable from a cybersecurity professional standpoint as they are pressed for time. This example most 'interesting' incident is one email that has had an example autonomous action taken by the autonomous response module to protect against, for example, phishing and/or malware. The write up will convey the example details, such as whether the detected malicious link was previously known or unknown to the system, a UUID of the email: 922E6673-3AFE-4A85-B045-4ADE105A8245.1, the content in the From field: joshua_wilson@banktec2[.]ru the content in the Subject field on that email: "Please Review Transfer of Funds", any attachments on the email such as Payload: http://xiamdmlsk[.]com/universal/index[.]php, the autonomous action response taken: Lock Link, Microsoft Actioned or not, any similar emails this reporting period, etc.

The page in the email threat report generated by the autonomous email-report composer could state "The following is a selected email that had an autonomous response action and was too subtle to be detected by other security tools used in this network. Five similar emails had a similar phishing link and the user tried to access the link in each email. The system suggests blocking access from a sender from the email address from this domain."

Figure 7A:
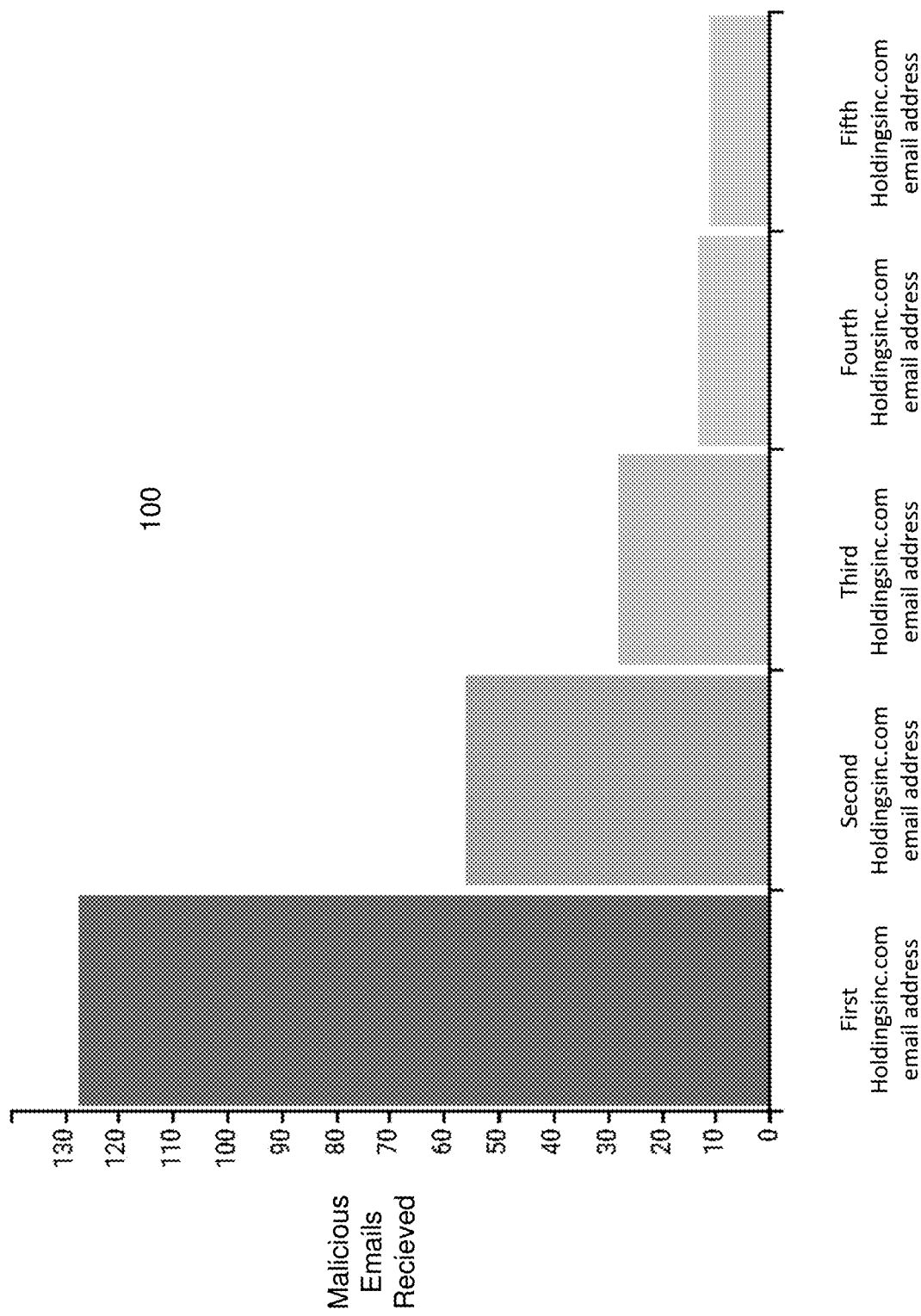
FIGS. 7A-7B illustrate diagrams of an embodiment of an example email threat report generated by the autonomous email-report composer including a list of users in the email network that are at the most risk to provide actionable information to take in light of the cyber threats, and then populate suggested actionable actions to take in the email threat report.
Figure 7B:
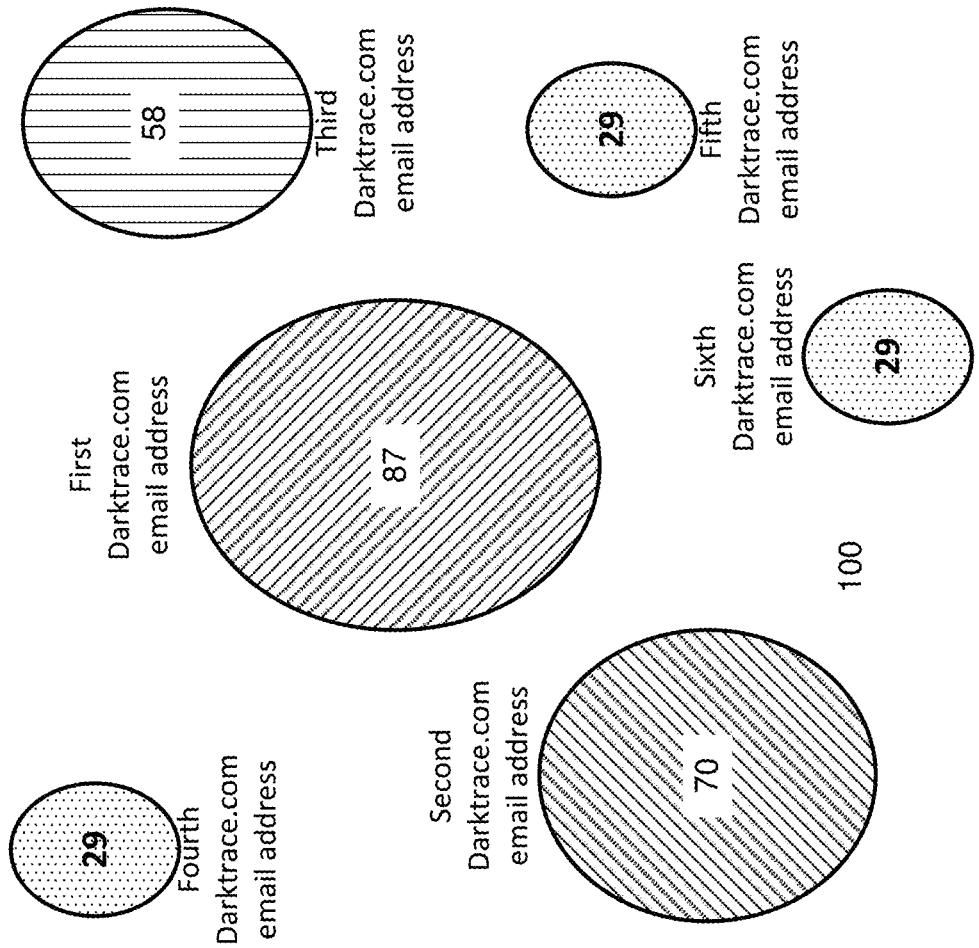

FIGS. 7A-7B illustrate diagrams of an embodiment of the email threat report generated by the autonomous email-report composer including a list of users in the email network that are at the most risk. The analyzer module and the autonomous email-report composer can cooperate with the data store to identify and supply a list of users in the email network that are at a most risk from emails over the period of time. The autonomous email-report composer cooperates with the analyzer module report generator, one or more libraries of templates, and one or more AI models in the email protection system 100 to compose at least a page in the current email threat report to represent the most at-risk users. For example, the most at-risk users can be those who deviate from the organizational norm and/or those who have received a most amount of emails that possess a malicious intent, those who received a most dangerous email, etc.

Referring to FIG. 7A, an anomalous email is that which is detected as outside the usual pattern of life for the user and exhibits traits that may suggest a malicious intent. The following users receive the most email of this kind in the last seven days. For each user, the number of malicious emails is included alongside the number of anomalous links contained. A bar graph of five email addresses and a graphic of the five email addresses should be displayed in email threat report generated by the autonomous email-report composer. The graphic of the five email addresses that should be displayed in email threat report would indicate as follows. A first Holdingsinc.com email address received 127 malicious emails with 72 anomalous links observed. A second Holdingsinc.com email address received 56 malicious emails with 33 anomalous links observed. A third email Holdingsinc.com address received 28 malicious emails with 28 anomalous links observed. A fourth email Holdingsinc.com address received 13 malicious emails with 2 anomalous links observed. A fifth email Holdingsinc.com address received 11 malicious emails with zero anomalous links observed.

Referring to FIG. 7B, an anomalous email is that which is detected as outside the usual pattern of life for the user and exhibits traits that may suggest a malicious intent. The following users receive the most email of this kind in the last seven days. For each user, the number of malicious emails is included alongside the total number of links observed. A ball graphic of six email addresses and a graphic of the five email addresses should be displayed in email threat report generated by the autonomous email-report composer. The graphic of the six email addresses that should be displayed in email threat report would indicate as follows. A first Darktrace.com email address received 87 malicious emails with 820 total number of links observed. A second Darktrace.com email address received 70 malicious emails with 99 total number of links observed. A third email Darktrace.com address received 58 malicious emails with 510 total number of links observed. A fourth email Darktrace.com address received 29 malicious emails with 273 total number of links observed. A fifth email Darktrace address received 29 malicious emails with 368 total number of links observed. A sixth email Darktrace email address received 29 malicious emails with 442 total number of links observed.

Referring to FIG. 1, a visual representation on this summary page illustrates a graph of nodes of generated by the autonomous email-report composer showing users at risk. The nodes are links to similar users and or groups of users. The most at risk users may be for example: Key targets: john.ayre@holdingsinc.com; david.smith@holdingsinc.com; and angela.darling@holdingsinc.com.

The autonomous email-report composer on this page of the generated email threat report draws extended risk networks showing the possible ways the organization is being targeted based on the above incidents; rather than, presenting quarantined emails or attack campaigns without intent analysis. This enables automated identification of email campaigns—displaying the users affected as nodes and then showing others with a high similarity who may be a) similarly targeted user in the future or b) a vector across which the attack could then spread. Also, the autonomous email-report composer can identify shared groupings between the user and similar users via, for example, pulling from Office 365 and/or generated by AI classifiers to link the targeting of the attack to other possible targets.

Referring to FIG. 1 again, the autonomous email-report composer can also cooperate with the AI models trained with machine learning on a normal email pattern of life for entities in the email network in order to draw links between email incidents (including email campaigns) to identify trends between current users affected by email incidents and then other users, with a high similarity to the current users affected, who may be similarly targeted in a future. Next, the autonomous email-report composer can generate a write up on the links between the email incidents to highly similar users.

The autonomous email-report composer in this page as well as in other pages of the generated report highlights particularly at-risk users with details about the targeting methods (such as aliases used to impersonate them), or the way their behavior deviates from the pattern of life for the organization (as sender and as recipient), etc. Note, as discussed above, to first find the most at-risk users and then later draw the links, the autonomous email-report composer can use AI models and algorithms to create a complex analysis on the most at-risk users—those who deviate from the organizational norm—and can include details of attacks leveled at these users.

Note, the trend arrows shown on the page indicate whether there's been an increase or decrease in activity compared to norms. For example, the trend arrows will indicate whether a particular type of activity has increased, decreased, or remained constant compared with the previous seven days. The autonomous email-report composer uses an intelligent algorithm to compare current data to historic data in the data store to perform and report trend analysis.

Referring back to the graph of nodes in FIG. 1, the different colors or shades of grayscale, such as orange, red, and green, indicate the severity of email attacks upon a particular email user who is represented as a node in that graph. The relative size of the node/dot representing the email user indicates an amount and how many email attacks are occurring on that user's email account. The link lines indicate contacts, work group associations, etc. between linked users, and similar links due to an amount of times each email user linked is being copied on similar emails with other users in the organization represented on that graph of users in the network. The link lines can use an association scoring from an AI classifier trained on associations. Thus, a size of the node indicates the volume of bad emails received during that period of time. The larger the node, then the more bad emails that user received. The autonomous email-report composer can use this AI classifier and plotting algorithm 1) to draw links between incidents or campaigns as well as 2) to identify trends.

As discussed, the graph of nodes can label a specific user to selectable number of nodes. The email threat report labels the set of individual nodes that have the combination of most severe bad emails received in combination with the biggest volume of bad emails. The set of individual nodes with labels on the graph can be, for example, the top three or five users/email addresses, that were most at risk for that particular duration of time, such as the week represented in this example report. The labels help to individually point out to the target audience reviewing this report, particular email users of that email system that are at risk from email cyber threats and possibly need additional training and/or security measures put in place.

Referring to FIG. 7A, the email threat report generated by the autonomous email-report composer shows user exposure to provide actionable information about users who are most at risk. The autonomous email-report composer populates these pages with visual representations, such as graphs and bubbles, that indicate the most at-risk users and/or those who have received a most amount of emails that suggest the malicious intent and/or highest percentage of emails that suggest the malicious intent, and/or who received the most dangerous emails.

For each user, the number of malicious mails are included alongside the number of malicious links observed.

For example, a graph of malicious emails received for the top six targeted and most at-risk users is generated by the autonomous email-report composer and then the autonomous email-report composer also textually lists those top 6 most at-risk users on this page. For example, angela.darling@holdingsinc.com received 127 malicious emails containing a total of 72 malicious links during the time period. John.ayre@holdingsinc.com received 56 malicious emails containing a total of 33 malicious links during the time period. Graham.penn@holdingsinc.com received 28 malicious emails containing a total of 28 malicious links during the time period, etc. These most at risk users are visually and textually conveyed on this page. FIG. 7B is similar to page 7A but visually represents the most at risk users' details in different sized and possibly colored bubbles in the email threat report rather than in a bar graph.

Note, an anomalous email can be an email that is detected as outside the usual pattern of life for the user and/or exhibits traits that may suggest a malicious intent.

When the email threat report provides i) a list of most at risk user as well as ii) links to similar users to users affected by an email attack, both of these provide actionable information about users who are most at risk. When the cyber professionals see those most at risk, then they can adjust the permissions and security around those users to prevent the actual attacks occurring on their particular email network.

Figure 8:
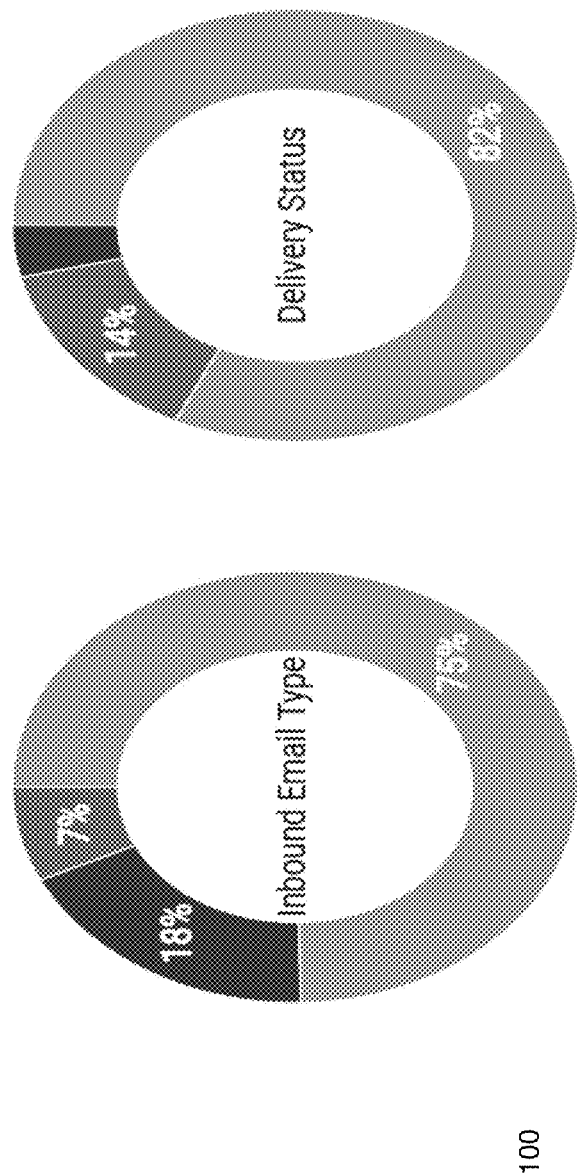
FIG. 8 illustrates a diagram of an embodiment of an example email threat report generated by the autonomous email-report composer showing example autonomous response actions taken by the autonomous response module without a human initiating that action.

FIG. 8 illustrates a diagram of an embodiment of the email threat report generated by the autonomous email-report composer showing example autonomous response actions taken by the autonomous response module without a human initiating that action. In this example, the autonomous email-report composer creates a set of pie charts. The pie charts visually illustrate emails received by the users within the organization. The pie charts can show a composition of, for example, an amount of One-to-One communications (where only a single user within the company has ever had contact with this email address) over to bulk mail communications (sent to multiple users and indicative of newsletters or sales material) and what percent were delivered.

Note, one-one communications can be bad because:

the singular relationship may indicate that the external email is a fraudulent one. For example, an external person to the email domain typically communicates with multiple employees within the organization, at least cc'ing them. Whereas, a malicious actor impersonating the external person would merely contact the user they are targeting to minimize detection.

A singular relationship can be evidence of potential data loss like an internal email user sending an email with an attachment to their own home email address or leaking information to contacts at other companies.

The email threat report generated by the autonomous email-report composer on this page could state "This breaks down covers the type of inbound main flow received over the last seven days and the actions performed on that email. Email received by users within the organization was composed of the following amount of One-to-One communications (where only a single user within the company has ever had contact with this email address) and the bulk mail communications (sent to multiple users and indicative of newsletters or sales material).

The example autonomous response actions taken by the autonomous response module could be 14% of emails were put on hold, 5% of emails had their links Lock Linked, 3% of emails were moved to the Junk folder, 2% of emails had their links Double Lock Linked, 1% of emails had their links deleted, etc. The autonomous email-report composer can cooperate with the data store and the autonomous response module to collect the data and calculate the information needed to populate the pie charts.

The autonomous email-report composer in the inbound mail summary page of the generated email threat report breakdowns percentages/numbers for the autonomous actions and the broad information on the pattern of life and organizational hygiene/compliance, which are useful for both an executive audience and an email administration point of view.

Figure 9:
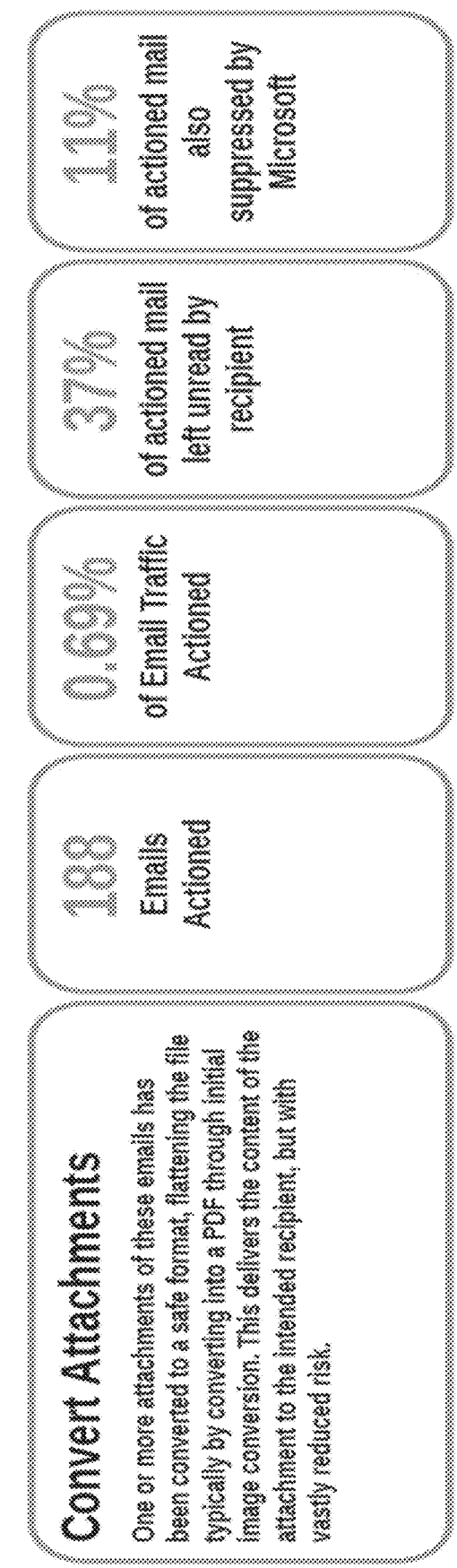
FIGS. 9-10 illustrate diagrams of an embodiment of an example email threat report generated by the autonomous email-report composer showing an example more in-depth analysis of specific autonomous response actions taken by the autonomous response module on the inbound email flow.
Figure 10:

FIGS. 9-10 illustrate diagrams of an embodiment of the email threat report generated by the autonomous email-report composer showing an example more in-depth analysis of specific autonomous response actions taken by the autonomous response module on the inbound email flow.

Referring to FIG. 9, the autonomous email-report composer populates on this page details for autonomous actions on attachments on an email.

The autonomous response module received notice from the assessment module that one or more attachments on an email under analysis is potentially malicious. The autonomous response module applies an algorithm to convert attachments on the email to be safe. One or more attachments of these emails has been converted to a safe format, flattening the file typically by converting into a PDF through initial image conversion. This delivers the content of the attachment to the intended recipient, but with vastly reduced risk.

The autonomous email-report composer in the email protection system 100 populates on this page details for autonomous actions on attachments on an email such as 188 emails actioned, 0.69% of email traffic actioned, 37% of actioned email left unread by recipient, 11% of actioned email also suppressed by Microsoft, etc. by using a template from a library and data from the other modules and the datastore.

Referring to FIG. 10, the autonomous email-report composer populates on this page details for autonomous actions on links in an email by the email protection system 100. The autonomous response module applies an algorithm to modify links determined to be likely malicious in the email to be safe. The action of Lock Links can replace the URL of a link such that a click will request confirmation from the user before proceeding. The link destination and original source will be subject to additional checks before the user is permitted to access the source. Otherwise, the double lock link action will be performed. The autonomous email-report composer populates on this page details for autonomous actions on attachments on an email such as 1680 emails lock link actioned, 6.1% of email traffic lock link actioned, 86% of lock link actioned mail left unread by recipient, etc.

The action of double Lock Links can replace the URL of the link with a substitute link provided by the autonomous response module. If the link is clicked, the user will be presented with the following message: "this link has been locked and cannot be accessed." The user will be unable to follow the link to the original source, but their intent to follow the link will be recorded by the autonomous response module and datastore. The autonomous email-report composer populates on this page details for autonomous actions on attachments on an email such as 82 emails double Lock Link actioned, 0.3% of email traffic double Lock Link actioned, 80% of double Lock Link actioned email left unread by recipient, etc.

The user interface has an input to override ability for a human analyst to edit and/or augment the report. As discussed, the report generator may do automatic selection of high-confidence models based upon model risk factors by default, but the user interface provides an input for an override ability for the human analyst to select them.

With the user interface, the email threat report that is generate can be shown on a display screen visually allowing for the user to interact and hover over different aspects of the email threat report to get additional information and hyperlink to information more detailed information. In addition, the generated email threat report can be exported and printed out/able to be saved in a PDF type format.

Example Email Protection System

Figure 11:
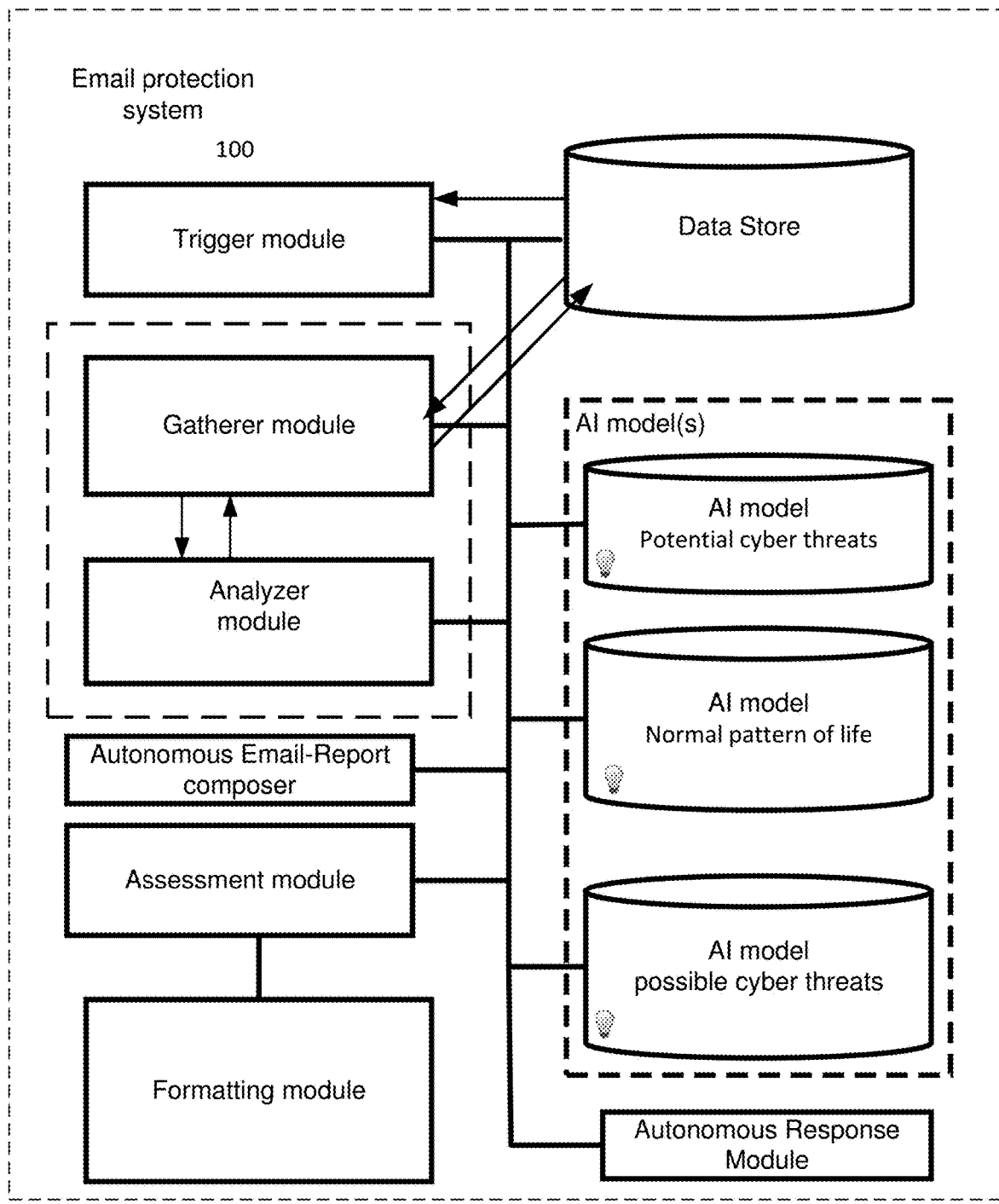
FIG. 11 illustrates a block diagram of an embodiment of various Artificial Intelligence models and modules of an email protection system to protect a system, including but not limited to an email network, from cyber threats.

FIG. 11 illustrates a block diagram of an embodiment of various Artificial Intelligence models and modules of an email protection system to protect a system, including but not limited to an email network, from cyber threats. The email protection system 100 may include a trigger module, a gatherer module, an analyzer module, an assessment module, a formatting module, an autonomous email-report composer, a data store, one or more Artificial Intelligence models trained on potential cyber threats and their characteristics, symptoms, remediations, etc., one or more Artificial Intelligence models trained with machine learning on a normal email pattern of life for entities in the email network, one or more Artificial Intelligence models trained with machine learning on email threat report generation, and multiple libraries of text and visual representations to cooperate the library of page templates to populate visual representations, such as graphs, and text on the pages of the email threat report.

Referring to FIG. 11, the trigger module may detect time stamped data indicating an event is occurring and then triggers that something unusual is happening. The gatherer module is triggered by specific events or alerts of i) an abnormal behavior, ii) a suspicious activity, and iii) any combination of both. The trigger module may identify, with one or more AI models trained with machine learning on a normal email pattern of life for entities in the email network, at least one of i) an abnormal behavior, ii) a suspicious activity, and iii) any combination of both, from one or more entities in the system.

The inline data may be gathered on the deployment when the traffic is observed. The gatherer module may initiate a collection of data to support or refute each of the one or more possible cyber threat hypotheses that could include this abnormal behavior or suspicious activity by the one or more AI models trained on possible cyber threats.

The gatherer module may consist of multiple automatic data gatherers that each look at different aspects of the data depending on the particular hypothesis formed for the analyzed event. The data relevant to each type of possible hypothesis can be automatically pulled from additional external and internal sources. Some data is pulled or retrieved by the gatherer module for each possible hypothesis.

The gatherer module may further extract data, at the request of the analyzer module, on each possible hypothetical threat that would include the abnormal behavior or suspicious activity; and then, filter that collection of data down to relevant points of data to either 1) support or 2) refute each particular hypothesis of what the potential cyber threat, e.g. the suspicious activity and/or abnormal behavior, relates to. The gatherer module and the data store can cooperate to store an inbound and outbound email flow received over a period of time as well as autonomous actions performed by the autonomous response module on that email flow. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

A feedback loop of cooperation between the gatherer module and the analyzer module may be used to apply one or more models trained on different aspects of this process.

The analyzer module can form one or more hypotheses on what are a possible set of activities including cyber threats that could include the identified abnormal behavior and/or suspicious activity from the trigger module with one or more AI models trained with machine learning on possible cyber threats. The analyzer module may request further data from the gatherer module to perform this analysis. The analyzer module can cooperate with the one or more Artificial Intelligence models trained with machine learning on the normal email pattern of life for entities in the email network to detect anomalous email which is detected as outside the usual pattern of life for each entity, such as a user, of the email network. The analyzer module can cooperate with the Artificial Intelligence models trained on potential cyber threats to detect suspicious emails that exhibit traits that may suggest a malicious intent, such as phishing links, scam language, sent from suspicious domains, etc. In addition, the gatherer module and the analyzer module may use a set of scripts to extract data on each possible hypothetical threat to supply to the analyzer module. The gatherer module and analyzer module may use a plurality of scripts to walk through a step by step process of what to collect to filter down to the relevant data points (from the potentially millions of data points occurring in the network) to make a decision what is required by the analyzer module.

The analyzer module may further analyze a collection of system data, including metrics data, to support or refute each of the one or more possible cyber threat hypotheses that could include the identified abnormal behavior and/or suspicious activity data with the one or more AI models trained with machine learning on possible cyber threats. The analyzer module then generates at least one or more supported possible cyber threat hypotheses from the possible set of cyber threat hypotheses as well as could include some hypotheses that were not supported/refuted.

The analyzer module may get threat information from Open Source APIs as well as from databases as well as information trained into AI models.

The analyzer module learns how expert humans tackle investigations into specific cyber threats. The analyzer module may use i) one or more AI models and/or ii) rules based models and iii) combinations of both that are deployed onto one or more servers or can be hosted within a separate plug-in appliance connecting to the network.

The AI models use data sources, such as simulations, database records, and actual monitoring of different human exemplar cases, as input to train the AI model on how to make a decision. The analyzer module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

Each hypothesis has various supporting points of data and other metrics associated with that possible threat, and a machine learning algorithm will look at the relevant points of data to support or refute that particular hypothesis of what the suspicious activity and/or abnormal behavior relates to.

The analyzer module may perform analysis of internal and external data including readout from machine learning models, which output a likelihood of the suspicious activity and/or abnormal behavior related for each hypothesis on what the suspicious activity and/or abnormal behavior relates to with other supporting data to support or refute that hypothesis.

The assessment module may assign a probability, or confidence level, of a given cyber threat hypothesis that is supported and a threat level posed by that cyber threat hypothesis, which includes this abnormal behavior or suspicious activity, with the one or more AI models trained on possible cyber threats. The assessment module can cooperate with the autonomous response module to determine an appropriate response to mitigate various cyber-attacks that could be occurring.

In an example, a behavioral pattern analysis of what are the unusual behaviors of the network/system/device/user under analysis by the machine learning models may be as follows. The cyber defense system uses unusual behavior deviating from the normal behavior and then builds a chain of unusual behavior and the causal links between the chain of unusual behavior to detect cyber threats (For example see FIG. 17). The unusual pattern can be determined by filtering out what activities/events/alerts that fall within the window of what is the normal pattern of life for that network/system/device/user under analysis, and then the pattern of the behavior of the activities/events/alerts that are left, after the filtering, can be analyzed to determine whether that pattern is indicative of a behavior of a malicious actor—human, program, or other threat. Next, the cyber defense system can go back and pull in some of the filtered out normal activities to help support or refute a possible hypothesis of whether that pattern is indicative of a behavior of a malicious actor. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defense system is configurable in a user interface, by a user, enabling what type of automatic response actions, if any, the cyber defense system may take when different types of cyber threats, indicated by the pattern of behaviors under analysis, that are equal to or above a configurable level of threat posed by this malicious actor.

The assessment module may rank supported candidate cyber threat hypotheses by a combination of likelihood that this candidate cyber threat hypothesis is supported as well as a severity threat level of this incident type.

The formatting module can have an autonomous email-report composer that cooperates with the various AI models and modules of the email protection system 100 as well as at least a set of one or more libraries of sets of prewritten text and visual representations to populate on templates of pages in the email threat report. The autonomous email-report composer can compose an email threat report on cyber threats that is composed in a human-readable format with natural language prose, terminology, and level of detail on the cyber threats aimed at a target audience being able to understand the terminology and the detail. The modules and AI models cooperate with the autonomous email-report composer to indicate in the email threat report, for example, an email attack's 1) purpose and/or 2) targeted group (such as members of the finance team, or high level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three.

The system may use at least three separate machine learning models. For example, a machine learning model may be trained on specific aspects of the normal pattern of life for entities in the system, such as devices, users, network traffic flow, outputs from one or more cyber security analysis tools analyzing the system, etc. One or more machine learning models may also be trained on characteristics and aspects of all manner of types of cyber threats. One or more machine learning models may also be trained on composing email threat reports.

The various modules cooperate with each other, the AI models, and the datastore to carry out the operations discussed herein. The trigger module, the AI models, the gatherer module, the analyzer module, the assessment module, the formatting module, and the data store cooperate to improve the analysis and formalized report generation with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report.

As discussed, the autonomous email-report composer and the AI models trained on email threat reports, compose the email threat report on cyber threats, which is composed in a human-readable format with natural language prose, terminology, and level of detail on the cyber threats, all aimed to communicate with a target audience. The autonomous email-report composer cooperates with libraries with pre-written text templates with i) standard pre-written sentences written in the natural language prose and ii) prewritten text templates with fillable blanks that are populated with data for the cyber threats specific for a current email threat report. A template for the type of report contains two or more sections in that template. Each section can span one or more pages in the email threat report. Each section has different standard pre-written sentences written in the natural language prose, visual representations, and other items to put into the generated email threat report.

Figure 12:
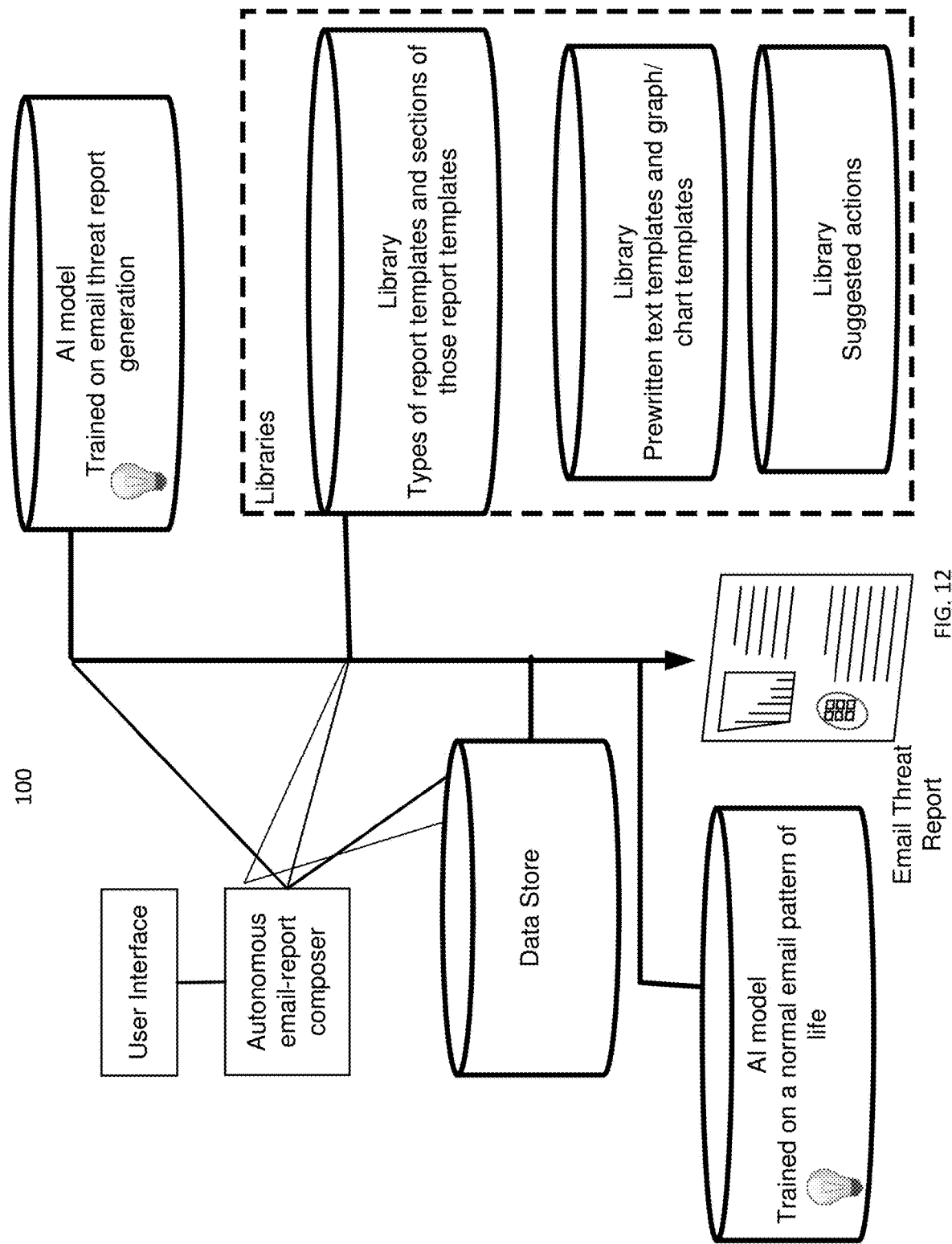
FIG. 12 illustrates a block diagram of an embodiment of an autonomous email-report composer cooperating with a set of one or more libraries, one or more Artificial Intelligence models trained with machine learning on a normal email pattern of life for entities in the email network, and one or more AI models trained on email threat report generation.

FIG. 12 illustrates a block diagram of an embodiment of an autonomous email-report composer cooperating with a set of one or more libraries, one or more Artificial Intelligence models trained with machine learning on a normal email pattern of life for entities in the email network, and one or more AI models trained on email threat report generation. The autonomous email-report composer can compose an email threat report on cyber threats that is composed in a human-readable format with natural language prose, terminology, and level of detail on the cyber threats aimed at a target audience, such as a business executive, a cyber security professional, etc., being able to understand the terminology and the detail populated onto the pages of the email threat report.

The formatting module and the autonomous email-report composer can communicate with one or more Artificial Intelligence models trained with machine learning to derive a normal pattern of life of entities in the network so that, for example, a breach of the AI models with its data and description are used to map specific incidents into related fillable blanks in the sentences.

The autonomous email-report composer cooperates with the one or more libraries of sets of prewritten text templates and visual representation templates (e.g. graph/chart/bubbles/etc.) to start with these templates. The prose of the email threat reports can be generated from a combination of selecting sentences from a library of with i) one or more standard pre-written sentences written in the natural language prose derived from previously generated email threat reports as well as ii) one or more of the prewritten text templates with fillable blanks, also derived from previously generated email threat reports. The fillable blanks are populated with data from cyber threats specific for a current email threat report being composed with detailed information about an email pattern of life for an organization observed by an email protection system 100 and vulnerabilities found in the email network during a period of time covered by the current email threat report. The stored data can be retrieved from the data store and other modules and then intelligently dropped into each appropriate area(s)/section(s) of a template for that email threat report by the autonomous email-report composer.

Again, the autonomous email-report composer can cooperate with the library of templates. In the library of page/section templates, one or more templates for each page/section of the email threat report is stored. Each page/section can have different standard pre-written sentences written in the natural language prose as well as one or more of the prewritten text templates with fillable blanks for that page of the email threat report on cyber threats and potentially one or more visual representations to populate on that page. The autonomous email-report composer can cooperate with the analyzer module, assessment module, and the AI models trained on email threat reports to determine incidents to report on as well as the data store to obtain the data in order to populate the fillable blanks and/or visual representations with that data.

The autonomous email-report composer can select the report template from two or more types of report templates aimed at different target audiences. For example, a template for the email threat report on the cyber threats can be an executive level threat-landscape drafted by the autonomous email-report composer with the natural language prose, the terminology, and the level of detail on the cyber threats aimed at a business executive audience; rather than a cyber security profession. The report can summarize the cyber threats encountered by an organization with individual incidents mapped to overall incident categories over a defined time period with an analysis and explanation of the summarized cyber threats. Overall, the autonomous email-report composer selects natural language prose and terminology from a set of libraries corresponding to terminology (e.g. words and phrases) and a level detail that a business executive audience should be able to understand.

When an email protection system 100 is deployed on a system, a user operator may execute the generation of an email threat report detailing the findings and activity of the email protection system 100. The graphical user interface of the email protection system 100 can provide one or more inputs to trigger the generation of such an email threat report. The user interface also provides the option to select from one or more templates desired by the user operator. The autonomous email-report composer can cooperate with a user interface to make the email threat report customizable for an end user to select what sections they want to appear in the presented and outputted email-threat report.

Thus, the autonomous email-report composer has a user interface to allow the pages in the report to be customizable for an end user, so there is a method of selecting what pages the user wants (like a write-up of potential data loss incidents) or of inputting IDs of emails to have the incident write up appear in the end report. Thus, the user interface presents options to receive an input from an end-user who wishes to have certain email incidents written-up and triaged without performing the analysis, or receive a selection of a specific page type (such as a breakdown of highly spoofed users) from available pages. For example, the user interface allows selection of automated selection of "bad" incidents to report as well as an ability for a human analyst to supply a UUID of an email to pull into the report. The UUID (Universal Unique Identifier) can be a 128-bit number used to uniquely identify some object or entity on the Internet.

The autonomous email-report composer can render the machine data and machine process in a high-level overview format for an executive audience, a more detailed email threat report for a human cyber analyst and/or a mix of both. The autonomous email-report composer organizes email security into a high-level report with sufficient depths of detail to provide an executive the information they need to know as well as can be customizable to include additional sections that are useful for a human cyber analyst as well. Again, for example, the autonomous email-report composer is configurable for a human cyber analyst to augment and edit this report, such as supply the UUID of an email, into the email threat report, which will then generate a full write up on that UUID of this email and the actions taken on this email on a page of the email threat report (See for example FIG. 6).

As discussed, a template for the email threat report contains two or more sections in that template. Each section has different standard pre-written sentences written in the natural language prose as well as one or more of the prewritten text templates with fillable blanks for that section.

The filled blanks can include, for example:

a full verbose description of each stage of the analysis process, including the hypotheses generated, results of the investigation, machine learning scores, the related data for each hypothesis as well as the salient details pivoted on for each hypothesis;

hygiene numbers on the email pattern of life in the email system as well as indicate current vulnerabilities and email attacks;

validity of the incident based upon further machine learning analysis, identification of the type of overall activity, the possible mitigation steps, and similar known incidents; and suggested mitigation steps, such as i) remove or prevented x, y, or z infections/phishing incidents, etc., from x, y, or z device via X, Y, or Z remedial actions; etc.

The autonomous email-report composer is able to select incidents and make broad trend suggestions about attacks because the modules of the email protection system 100 take in a greater amount of contextual information for analysis to allow things like reliable autonomous actions performed by the autonomous response module to remediate cyber threats, and a wide range of AI models analyzing this data, which the data gatherer of the autonomous email-report composer collects into a data store and makes available for the rest of the modules of the autonomous email-report composer.

A number of the pages/features are representations of more complicated analysis by algorithms within the autonomous email-report composer; rather than, just raw data numbers. For example, the information about known link correspondents is drawn from a large number of places and different metrics processed through the algorithms—so the autonomous email-report composer does have to do a complex analysis to create the links and then translate this into a logical format on a page in the email threat report (For example, see FIG. 1).

The autonomous email-report composer can cooperate with an autonomous action module, the data store, and one or more AI models on cyber threats to list actionable actions that were taken in light of the cyber threats (for example see FIGS. 9-10), and then populate suggested actionable actions to take into the email threat report (for example see FIG. 6). The autonomous email-report composer can cooperate with the above components to generate a detailed explanation into one or more interesting email incidents for an individual write up which includes details about at least a targeted user of an email attack, one or more autonomous actions taken by the autonomous response module to remediate the email attack, the characteristics of the derived attack type—like the payload/attachment-attack-type, phishing links, etc., as well as a derived purpose of the attack type (e.g. phishing, extortion, data loss, etc.), and a textual discussion on incident triage with details of a resolution taken (for example see FIG. 6). The email threat report reports on threats, interesting incidents, and other hygiene issues. As previously discussed, these interesting incidents are given a high-level triage with attack details, payload details and/or potential intent, discussed across the pages of the report.

Referring to FIG. 12, as discussed, the autonomous email-report composer cooperating with the one or more libraries of templates at least includes a library with a multitude of templates of different types of email threat reports and the sections found in each report template. Each different type of email threat report and the section found in each email threat report has its own library of prose for sentences found in that section, and the library can also include graphs/charts and/or other information found in that section of that type of email threat report.

The sections existing in each email threat report will be defined by the automatically determined template type where (pages, sections, etc.) in the email threat report to display the relevant information in the email threat report. Detail-oriented prose such as bullet points will be formatted differently than block paragraph content. The type of cyber threat and/or the category of cyber threat (such as phishing, Data Exfiltration, etc.) will define the type of information to be included in the email threat report, as each may have a corresponding set of salient data points that usually is found relevant in this type of breach. The autonomous email-report composer may choose to summarize the type of breaches occurring, followed by a more detailed email threat report of the salient data found in this incident. The autonomous email-report composer chooses sensible details utilized to support the type of breach and threat found along with fillable sentences from the library of prewritten sentences used typically to describe that type of breach in both historic content and content generated for the system, or the comparison of overall threat level of the breach in comparison between reporting periods. The autonomous email-report composer may choose from a selection of relevant sections to fill in to convey the current email threat report based upon a statistical analysis of how often a sentence conveying points X, or a graph conveying points Y are used when discussing this specific subject matter.

The autonomous email-report composer may also cooperate with a library of suggested actionable actions to take in light of the cyber threats, and then populate the suggested actionable actions to take onto a page in the report. The library of suggested actions to be taken is populated and then suggested based on the type of breaches/non-compliance/ detected and being conveyed in the machine drafted report. The library of suggested actions may be derived from the actionable actions derived from rich text descriptions of human analyst-generated reports, from a list of autonomous actions populated by the autonomous response module that it previously executed to halt similar cyber threats, from an alternative database, and any combination of these.

The autonomous email-report composer can cooperate with a natural language processing engine. After the autonomous email-report composer composes the type of report on cyber threats that is composed in the human-readable format with the natural language prose, terminology, and level of detail on the cyber threats aimed at the target audience, then the autonomous email-report composer can cooperate with a natural language processing engine to assess the overall coherence of the generated output. Thus, the natural language processing engine is configured to analyze the composed sentences pulled from the libraries and populated with the relevant data to check for human understandability and whether the composed sentences would make sense to a human reader as assembled versus being merely an assembly of incoherent words and sentences.

The natural language processing engine can analyze text, visual representations, and other information in the report to derive meaning from that content and check for a human comprehension level of the conveyed content. The natural language processing engine may achieve this comprehension analysis through, for example, multiple dictionaries tied with a descriptive analysis and how often a particular part of speech occurs relation to other concepts being discussed. The natural language engine therefore goes further than a simplistic check for the correct ratio of noun to verbs exists in the sentence but rather, identifies whether the generated sentence actually makes sense to a human or is simply an aggregation of incoherent babbling. Any sentences that are highlighted by the engine due to a low level of confidence, such as 90% accuracy confidence, can be flagged for a human to accept the generated sentence or revise the text in the report. The natural language sentences outputs can be combined with numerous pre-scripted sentences in a template report in order to give an overall generated incident description.

After the natural language processing engine, the autonomous email-report composer then can generate a revised draft report of the email threat report on the user interface for a human to review. The autonomous email-report composer can cooperate with the user interface to highlight areas and sections of the report indicating that the autonomous email-report composer does not have high confidence values in the human comprehension and/or proper composition of the drafted sentences or composed sections/paragraphs of the drafted report.

After the human review, or if configured by the user without human review, the final version of the email threat report is lastly compiled to have the analysis of the cyber threats, supporting data, and an explanation of the analysis by the modules of the email protection system 100, in prose and terminology aimed at a level of the target audience. The autonomous email-report composer intelligently renders a machine learning assisted analysis of cyber threats into a human readable report in an exportable format, defined by a target audience, with generated text and graphs exported in a human readable exported format based on one or more libraries of sets of prewritten text templates and graph templates.

Figure 13:
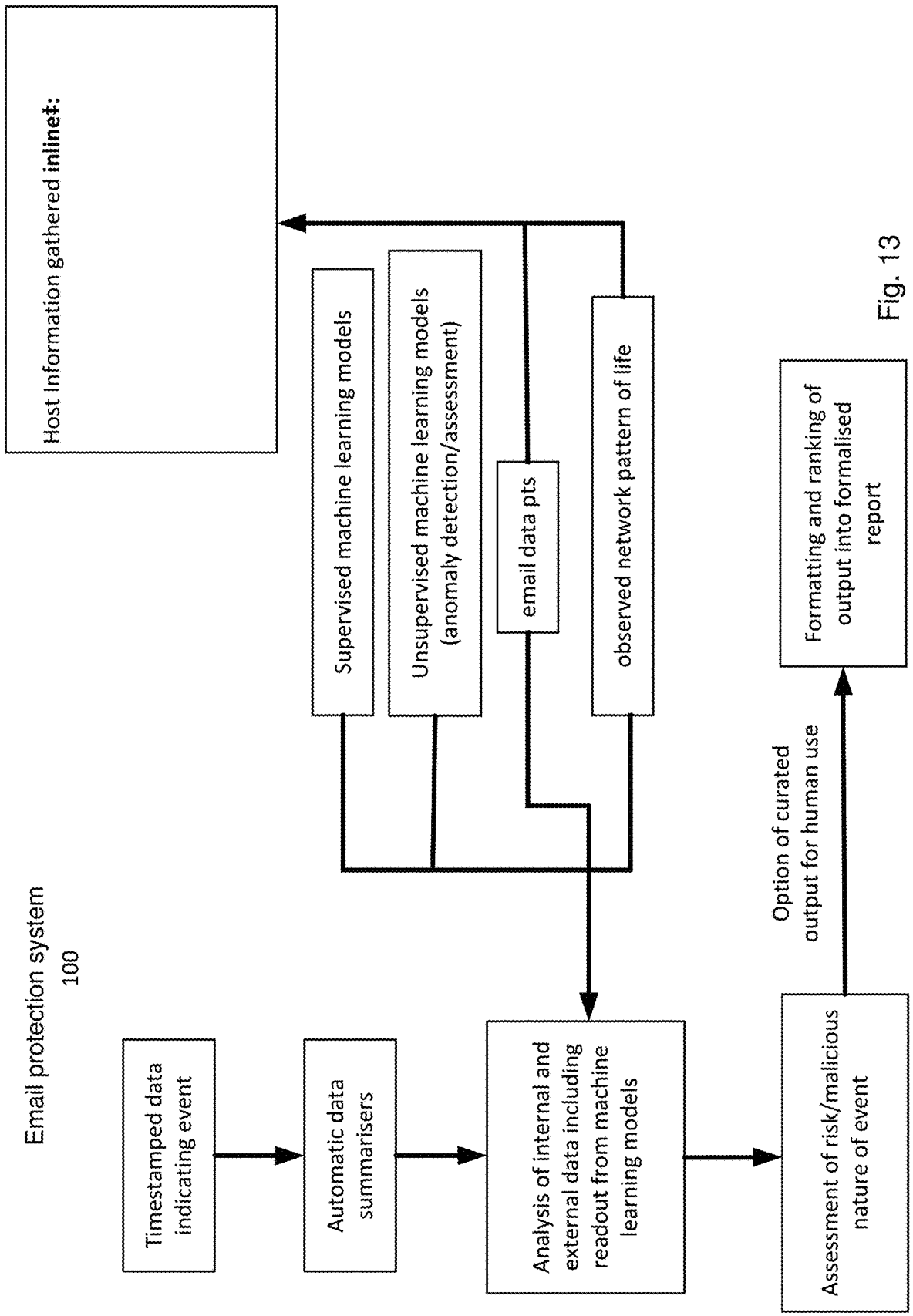
FIG. 13 illustrates a diagram of an example analysis process that involves making, testing, and refining a series of successive hypotheses, which can then be directly mapped to a full featured description of a given incident in the email threat report.

FIG. 13 illustrates a diagram of an example analysis process that involves making, testing, and refining a series of successive hypotheses, which can then be directly mapped to a full featured description of a given incident in the email threat report.

The analysis process can involve making, testing, and refining a series of successive hypotheses, which are assessed using a combination of supervised machine learning, unsupervised machine learning, and traditional algorithms. In one method, the stages and results of this process can be directly mapped to a full featured description of a given incident in the email threat report. These features can in part be used directly to create a natural language description of the relevant data discovered, as well the relevant hypotheses and kinds of data pivoted on to form these hypotheses.

These features can, for example, be converted to the dimensions of a hyperspace, allowing a given incident to be plotted in this space alongside the data observed for other known incidents. This representation can be used to train supervised classification and machine learning systems, allowing specific points in the hyperspace (i.e. incidents) to be mapped to overall descriptions of activity, probable causes of the activity, and mitigation steps. Using the same data, supervised recommender machine learning models can also be used to map specific incidents to related cases. The data resulting from these models can also be used to create a natural language summary of the incident. These natural language outputs can be combined with numerous pre-scripted sentences in a template report in order to give an overall generated incident description.

In an embodiment, the analyzer module in the email protection system 100 may be configured to use both:

one or more supervised machine learning models trained on agnostic examples of past history of detection of each possible type of cyber threat hypothesis previously analyzed by human cyber threat analysis, and one or more unsupervised machine learning models trained to perform anomaly detection verses a normal pattern of life to determine whether the abnormal behavior and/or suspicious activity is malicious or benign when the cyber threat is previously unknown.

The supervised machine learning models use innovative, optimal Machine Learning techniques and quality sources of data to train them. The data ingested and derived from observation of human analysts. The supervised machine learning models use a wide scope and/or wide variation of data (with good quality data) to start the machine learning process to produce strong enough learning to think the output will be valuable or useful to an analyst user. The supervised machine learning models use deep learning and reinforcement learning.

Once the email protection system 100 has decided an incident is reportable, the formatting module may generate an email threat report with a textual write up of an incident report in a human readable, formalized report format for a wide range of breaches of normal behavior, compared to the AI models trained with machine learning on the normal email pattern of life for entities in the email network. This formalized report may be derived from human supplied textual content and/or analyzing previous reports with one or more models trained with machine learning on assessing and populating relevant data into the incident report corresponding to each possible cyber threat.

The autonomous email-report composer renders the autonomous response actions on emails to mitigate the cyber threats and machine learnt information, including machine learning classifiers, into a human-readable report aimed at an executive audience.

The autonomous email-report composer cooperating with the one or more machine learning models further composes the report so that each section has its own library of i) prewritten standard sentences and charts/or graphs for that section with fillable blanks that are found in similar reports as well as ii) the standard pre-written sentences written in the natural language prose selected for that section. The library for that section also contains visual representations, such as graphs, charts, bubbles, etc., as usually used to convey information in that section. Thus, each section can have its own set of i) prewritten text templates, ii) preferred visual representations, and iii) any combination of these, that are routinely presented in each of those sections making up that type of report. A lookup occurs on the specifics for each incident being textually conveyed or graph being generated to select the most popular method of conveying that data in existing cyber threat reports. The salient data points that need to be conveyed can be looked up and grabbed from the machine data collected from the cyber threat incident being conveyed, and then populated with the grabbed data into the selected prewritten standard sentences with fillable blanks, which will now contain the specifics for this report. The salient data points including connection data, protocol data or network entity data such as IP addresses, and any other information may be retrieved from the data store.

Figure 14:
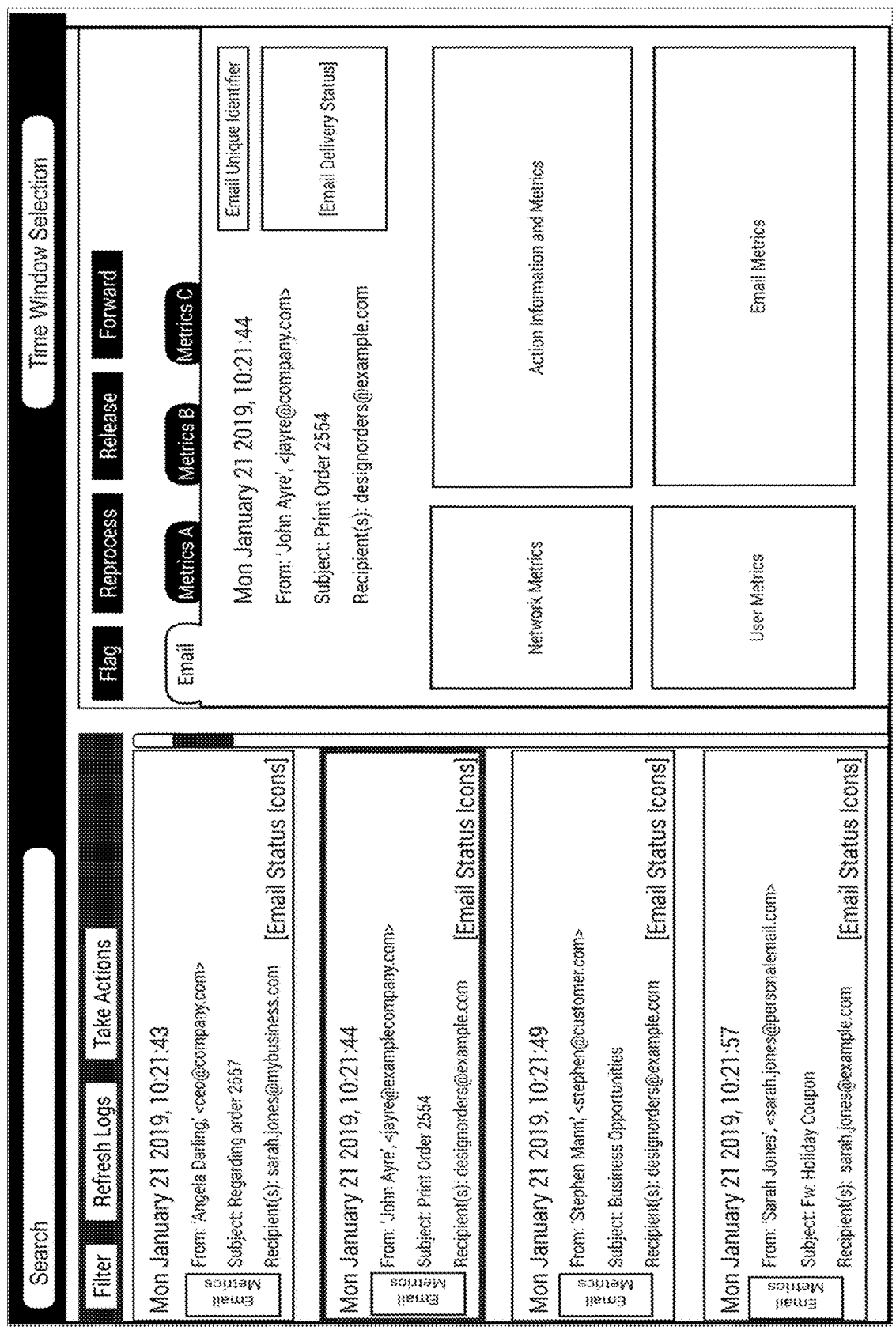
FIG. 14 illustrates a diagram of an embodiment of an example user interface with multiple windows displaying their respective information on a display screen on emails under analysis to collect data points to better assess whether those one or more emails are in fact a cyber threat.

FIG. 14 illustrates a diagram of an embodiment of an example user interface with multiple windows displaying their respective information on a display screen on emails under analysis to collect data points to better assess whether those one or more emails are in fact a cyber threat.

The data gather module has a set of email probes to inspect an email at the point it transits through the email application, such as Office 365, and extracts hundreds of data points from the raw email content and historical email behavior of the sender and the recipient. The combined set of the metrics are passed to the AI models to create a normal pattern of life for each entity in the email system.

The data store can store the metrics and previous threat alerts associated with each email for a period of time, which is, by default, at least 27 days. This corpus of data is fully searchable.

The analyzer module can retrospectively process an email application's metadata, such as Office 365 metadata, to gain an intimate knowledge of each of their users, and their email addresses, correspondents, and routine operations. The power of the analyzer module lies in leveraging this unique understanding of day-to-day user email behavior, of each of the email users, in relation to their past, to their peer group, and to the wider organization.

Armed with the knowledge of what is 'normal' for a specific organization and specific individual, rather than what fits a predefined template of malicious communications, the assessment module cooperating the analyzer module can identify subtle, sophisticated email campaigns which mimic benign communications and locate threats concealed as everyday activity.

Next, the data store can provide comprehensive email logs for every email observed. These logs can be filtered with complex logical queries and each email can be interrogated on a vast number of metrics in the email information stored in the data store.

Some example email characteristics that can be stored and analyzed are:

Email direction: Message direction—outbound emails and inbound emails.

Send Time: The send time is the time and date the email was originally sent according to the message metadata.

Links: Every web link present in an email has its own properties. Links to websites are extracted from the body of the email. Various attributes are extracted including, but not limited to, the position in the text, the domain, the frequency of appearance of the domain in other emails and how it relates to the anomaly score of those emails, how well that domain fits into the normal pattern of life of the intended recipient of the email, their deduced peer group and their organization.

Recipient: The recipient of the email. If the email was addressed to multiple recipients, these can each be viewed as the 'Recipients'.

Additional properties of the email recipient can be tracked including how well known the recipient was to the sender, descriptors of the volume of mail, and how the email has changed over time, to what extend the recipient's email domain is interacted with inside the network.

Subject: The email's subject line.

Attachment: Each attachment associated with the message can appear in the user interface here as individual entries, with each entry interrogatable against both displayed and advanced metrics. These include, but are not limited to, the attachment file name, detected file types, descriptors of the likelihood of the recipient receiving such a file, descriptors of the distribution of files such of these in all email against the varying anomaly score of those emails.

Headers: Email headers are lines of metadata that accompany each message, providing key information such as sender, recipient, message content type for example.

The analyzer module cooperates with many machine learning models. For example, the analyzer module cooperates with one or more machine learning models trained on a normal pattern of life for the system as well as one or more machine learning models trained on potential cyber threats. The one or more machine learning models are trained and otherwise configured with mathematical algorithms to infer, for the cyber-threat analysis, 'what is possibly happening with the chain of distinct alerts and/or events, which came from the unusual pattern,' and then assign a threat risk associated with that distinct item of the chain of alerts and/or events forming the unusual pattern.

Figure 17:
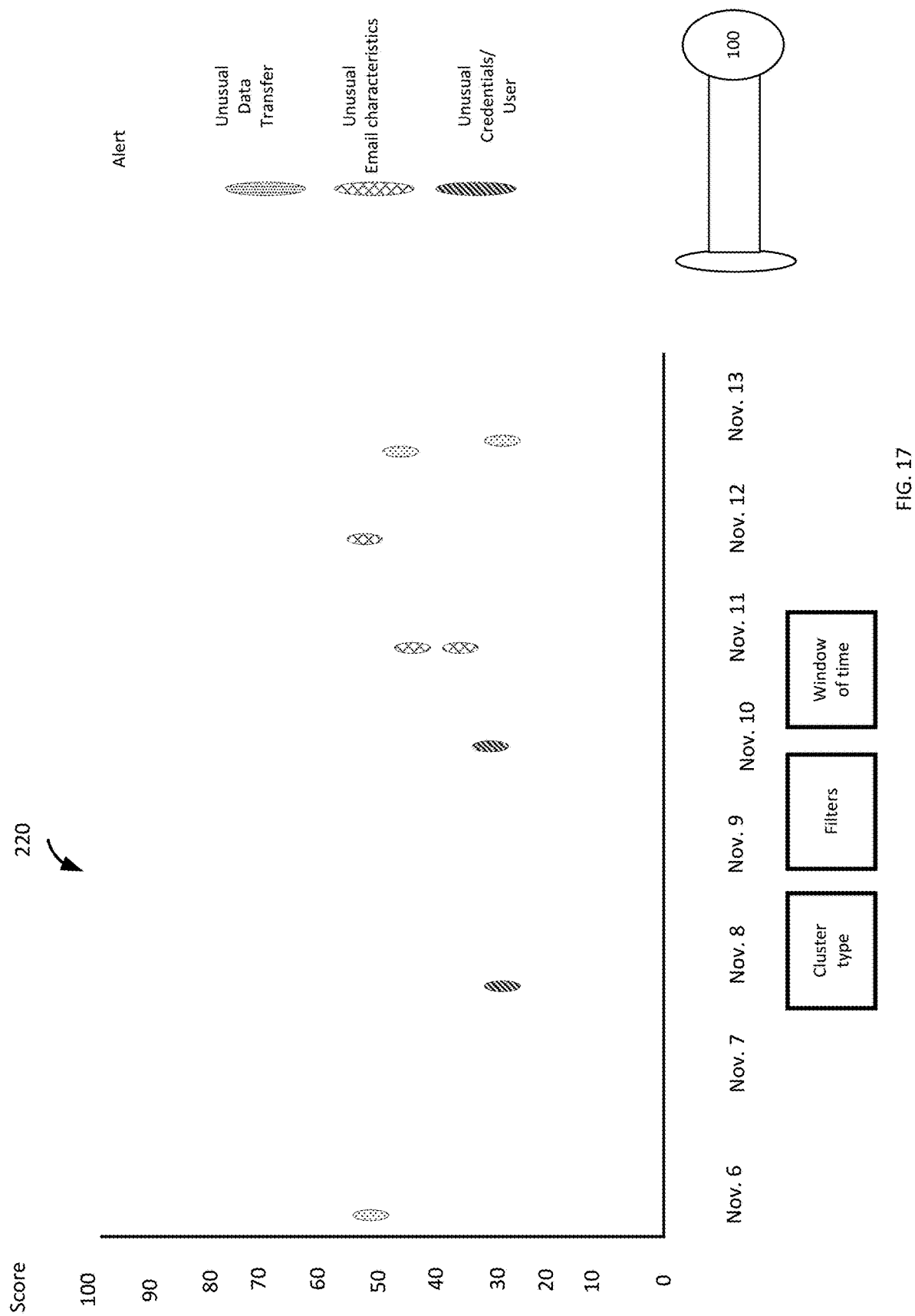
FIG. 17 illustrates a block diagram of an embodiment of the analyzer module cooperating with one or more machine learning models on an example behavioral pattern analysis in order to detect a chain of anomalous behavior.

This is 'a behavioral pattern analysis' of what are the unusual behaviors of the network/system/device/user/email under analysis by the analyzer module and the machine learning models. The email protection system 100 uses unusual behavior deviating from the normal behavior/pattern of life for the entity and/or organization, and then builds a chain of unusual behavior and the causal links between the chain of unusual behavior to detect cyber threats. FIG. 17 illustrates a block diagram of an embodiment of the analyzer module cooperating with the one or more machine learning models, on an example behavioral pattern analysis in order to detect a chain of anomalous behavior. An example behavioral pattern analysis of what are the unusual behaviors may be as follows. As discussed, the unusual pattern may be determined by filtering out what activities/events/alerts that fall within the window of what is the normal pattern of life for that network/system/device/user/email under analysis, and then the pattern of the behavior of the activities/events/alerts that are left, after the filtering, can be analyzed to determine whether that pattern is indicative of a behavior of a malicious actor—human, program, email, or other threat. Next, the email protection system 100 can go back and pull in some of the filtered out normal activities to help support or refute a possible hypothesis of whether that pattern is indicative of a behavior of a malicious actor. An example behavioral pattern included in the chain 220 is shown in the graph over a time frame of, an example, seven days. The email protection system 100 detects a chain of anomalous behavior 220 of unusual data transfers three times, unusual characteristics in emails in the monitored system three times which seem to have some causal link to the unusual data transfers.

Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident is the email protection system 100 in this assessment of identifying whether the unusual pattern was caused by a malicious actor is created.

Next, also assigned is a threat level parameter (e.g. score or probability) indicative of what level of threat does this malicious actor pose to the system. Lastly, the email protection system 100 is configurable in its user interface of the email protection system 100 on what type of automatic response actions, if any, the email protection system 100 may take when for different types of cyber threats that are equal to or above a configurable level of threat posed by this malicious actor.

The analyzer module may chain the individual alerts and events that form the unusual pattern into a distinct item for cyber-threat analysis of that chain of distinct alerts and/or events. The analyzer module may reference the one or more machine learning models trained on e-mail threats to identify similar characteristics from the individual alerts and/or events forming the distinct item made up of the chain of alerts and/or events forming the unusual pattern.

One or more machine learning models may also be trained on characteristics and aspects of all manner of types of cyber threats to analyze the threat risk associated with the chain/cluster of alerts and/or events forming the unusual pattern. The machine learning technology, using advanced mathematics, can detect previously unidentified threats, without rules, and automatically defend networks.

The AI models may perform by the threat detection through a probabilistic change in a normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and potentially IT network raw sources of data, a large number of metrics can be derived each producing time series data for the given metric.

The detectors in the analyzer module including its network module and email module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the email protection system 100 mathematically characterizes what constitutes 'normal' behavior in line with the normal pattern of life for that entity and organization based on the analysis of a large number/set of different measures of a device's network behavior. The email protection system 100 can build a sophisticated 'pattern of life'—that understands what represents normality for every person, device, email activity, and network activity in the system being protected by the email protection system 100.

In the analyzer module, the metrics of the emails under analysis are combined with pattern of life data of the intended recipient, or sender, sourced from the data store in combination with the analyzer module. In the assessment module, the combined set of the metrics are passed through machine learning algorithms to produce a single anomaly score of the email, and various combinations of metrics will attempt to generate notifications which will help define the 'type' of email.

Email threat alerts, including the type notifications, triggered by anomalies and/or unusual behavior of 'emails and any associated properties of those emails' are used by the analyzer module to better identify any network events which may have resulted from an email borne attack.

Figure 15:
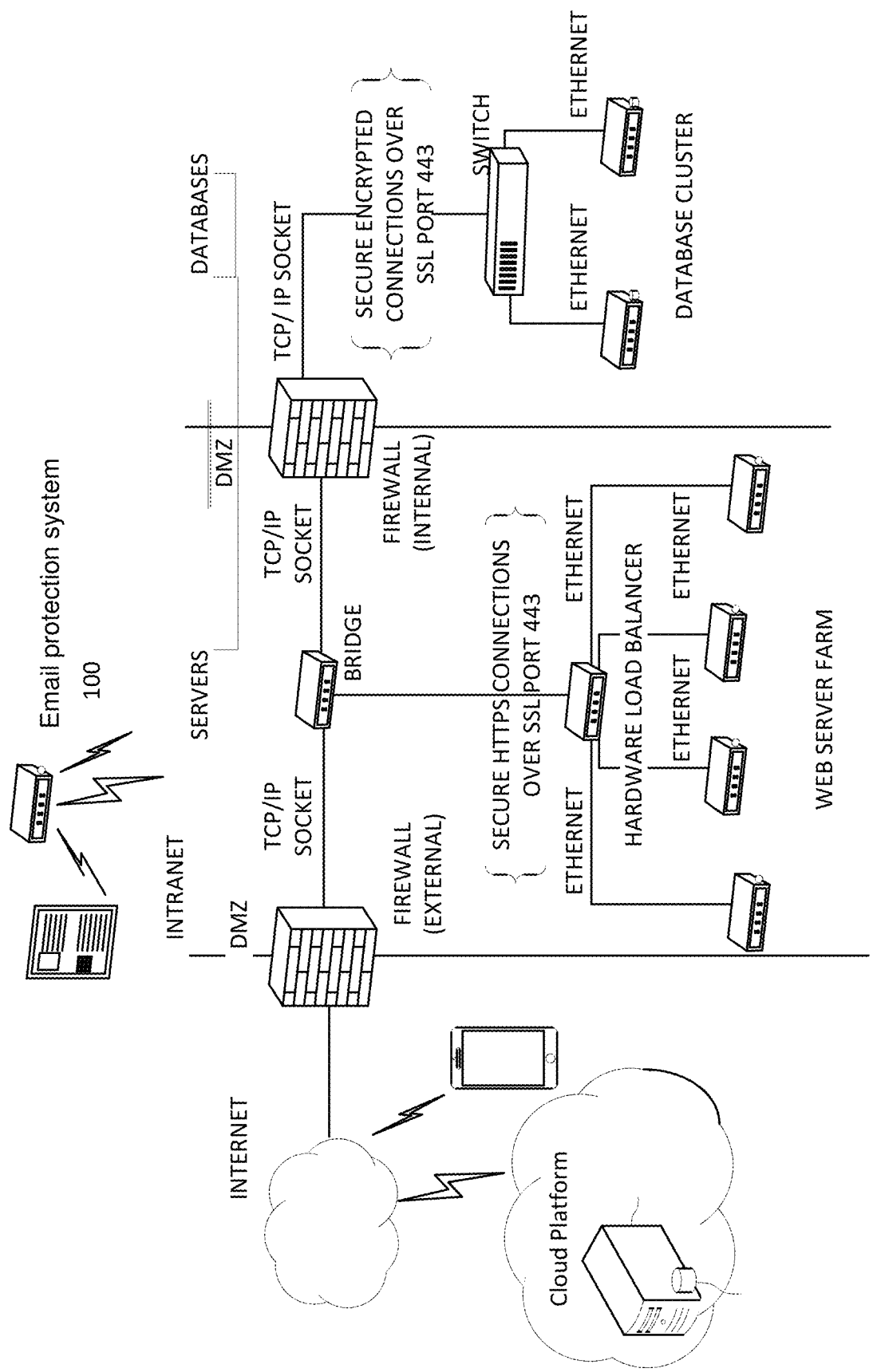
FIG. 15 illustrates a block diagram of an embodiment of the email protection system plugging in as an appliance platform to protect a system.

FIG. 15 illustrates a block diagram of an embodiment of the email protection system 100 plugging in as an appliance platform to protect a system.

Figure 16:
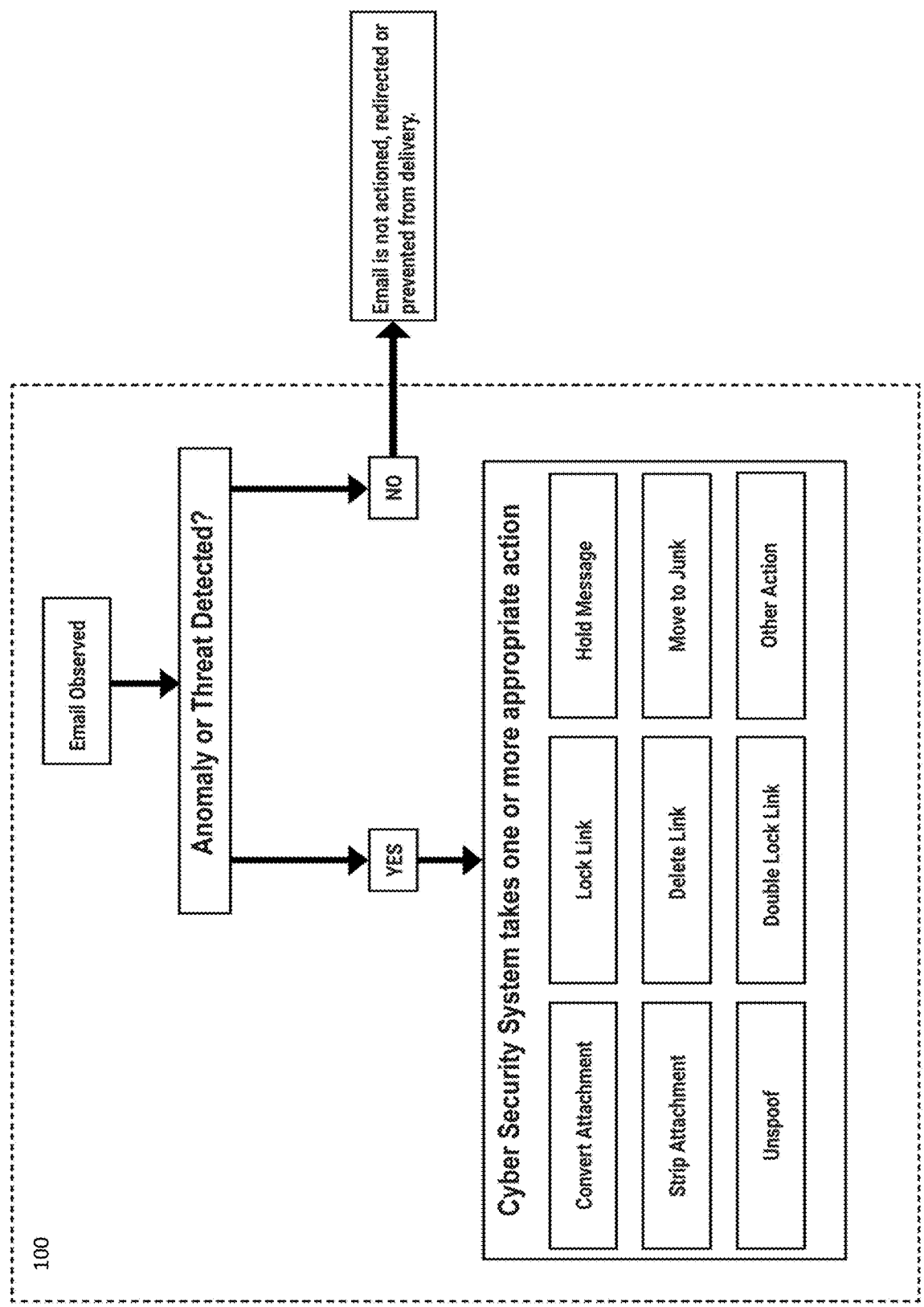
FIG. 16 illustrates a block diagram of an embodiment of example autonomous response actions, configurable by a user, in the autonomous response module of the email protection system.

FIG. 16 illustrates a block diagram of an embodiment of example autonomous response actions configurable by a user in the autonomous response module of the email protection system 100. The autonomous response module can be configured to take autonomous actions without a human initiating that action.

The autonomous response module is configurable, via the user interface, to know when it should take the autonomous actions to contain the cyber-threat when i) a known malicious email or ii) at least highly likely malicious email is determined by the cyber-threat module. The autonomous response module has an administrative tool, configurable through the user interface, to program/set what autonomous actions the autonomous response module can take, including types of actions and specific actions the autonomous response module is capable of, when the cyber-threat module indicates the threat risk parameter is equal to or above the actionable threshold, selectable by the cyber professional, that the one or more emails under analysis are at least highly likely to be malicious.

The types of actions and specific actions the autonomous response module customizable for different users and parts of the system; and thus, configurable for the cyber professional to approve/set for the autonomous response module to automatically take those actions and when to automatically take those actions.

The autonomous response module has a library of response actions types of actions and specific actions the autonomous response module is capable of, including focused response actions selectable through the user interface that are contextualized to autonomously act on specific email elements of a malicious email, rather than a blanket quarantine or block approach on that email, to avoid business disruption to a particular user of the email system. The autonomous response module is able to take measured, varied actions towards those email communications to minimize business disruption in a reactive, contextualized manner.

The autonomous response module works hand-in-hand with the AI models to neutralize malicious emails, and deliver preemptive protection against targeted, email-borne attack campaigns in real time.

The autonomous response module may take one or more proactive or reactive action against email messages, which are observed as potentially malicious. Actions are triggered by threat alerts or by a level of anomalous behavior as defined and detected by the cyber-security system and offer highly customizable, targeted response actions to email threat that allows the end user to remain safe without interruption. Suspect email content can be held in full, autonomously with selected users exempted from this policy, for further inspection or authorization for release. User behavior and notable incidents can be mapped, and detailed, comprehensive email logs can be filtered by a vast range of metrics compared to the model of normal behavior to release or strip potentially malicious content from the email.

Example Possible Actions

The following selection of example autonomous response actions appear on the user interface and can be taken by or at least suggested to be taken by the autonomous response module when the threat risk parameter is equal to or above a configurable set point set by a cyber security professional:

Hold Message: The autonomous response module has held the message before delivery due to suspicious content or attachments. Held emails can be reprocessed and released by an operator after investigation. The email will be prevented from delivery, or if delivery has already been performed, removed from the recipient's inbox. The original mail will be maintained in a buffered cache by the data store and can be recovered, or sent to an alternative mailbox, using the 'release' button in the user interface.

Lock Links: The autonomous response module deactivates the link in the email. The autonomous response module replaces the URL of a link such that a click of that link will first divert the user via an alternative destination. The alternative destination may optionally request confirmation from the user before proceeding. The original link destination and original source will be subject to additional checks before the user is permitted to access the source.

Convert Attachments: The autonomous response module converts one or more attachments of this email to a safe format, flattening the file typically by converting into a PDF through initial image conversion. This delivers the content of the attachment to the intended recipient, but with vastly reduced risk. For attachments which are visual in nature, such as images, pdfs and Microsoft Office formats, the attachments will be processed into an image format and subsequently rendered into a PDF (in the case of Microsoft Office formats and PDFs) or into an image of the original file format (if an image). In some email systems, the email attachment may be initially removed and replaced with a notification informing the user that the attachment is undergoing processing. When processing is complete the converted attachment will be inserted back into the email.

Double Lock Links: The autonomous response module replaces the URL with a redirected Email link. If the link is clicked, the user will be presented with a notification to that user that they are not permitted to access the original destination of the link. The user will be unable to follow the link to the original source, but their intent to follow the link will be recorded by the data store via the autonomous response module.

Strip Attachments: The autonomous response module strips one or more attachments of this email. Most file formats are delivered as converted attachments; file formats which do not convert to visible documents (e.g. executables, compressed types) are stripped to reduce risk. The 'Strip attachment' action will cause the system to remove the attachment from the email, and replace it with a file informing the user that the original attachment was removed.

Junk action: The autonomous response module will ensure the email classified as junk or other malicious email is diverted to the recipient's junk folder, or other nominated destination such as 'quarantine'.

Redirect: The autonomous response module will ensure the email is not delivered to the intended recipient but is instead diverted to a specified email address.

Copy: The autonomous response module will ensure the email is delivered to the original recipient, but a copy is sent to another specified email address.

Additional Points

The autonomous email-report composer in the generated report can select and then show threat detection AI models that have been particularly successful over the time period or have triggered more than usual with the suggestion that the operator follow up. The autonomous email-report composer can use an algorithm to collect data from the data store and assessment module to perform automatic selection of high-confidence models based upon model risk factors and through the user interface give a human analyst the ability to select them. The autonomous email-report composer then reports out in the email threat report an intelligent selection of high performing threat detection AI models along with the trend analysis.

The autonomous email-report composer can make a broad commentary on the email hygiene of the organization from a position where it has the pattern of life data to draw upon, but also based upon data gleaned from other sources like SaaS, Cloud, IT Network, etc.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
one or more processing units; and
a non-transitory computer readable medium including information accessible by the one or more processing units, the information comprises a formatting module and an autonomous email-report composer configured to cooperate with Artificial Intelligence (AI) models and modules of an email protection system and one or more libraries of sets of prewritten text and visual representations to populate on templates of pages in an email threat report,
wherein a template of the templates of pages in the email threat report comprises two or more sections, including i) standard pre-written sentences written in a natural language prose and ii) one or more visual representations,
wherein the autonomous email-report composer is configured, when executed by the one or more processing units, to compose the email threat report on cyber threats in a human-readable format with natural language prose, terminology, and detail on cyber threats aimed at a target audience, wherein the detail on the cyber threats includes a summary on different types of cyber threats occurring within an email network during a period of time covered by the email threat report,
wherein the autonomous email-report composer is configured, when executed by the one or more processing units, to cooperate with the one or more libraries with prewritten text templates and visual representation templates with i) one or more standard pre-written sentences written in the natural language prose derived from previously generated email threat reports and ii) one or more of the prewritten text templates with fillable blanks that are populated with data for the cyber threats specific for a current email threat report composed of a summary on different types of cyber threats occurring within the email network during a period of time covered by the current email threat report along with a trend indicator that indicates whether one of the types of cyber threats has increased, decreased, or remained constant during the period of time, where the autonomous email-report composer is configured to cooperate with the one or more AI models trained with machine learning on a normal email pattern of life for entities in the email network and a data store to compose content in the email threat report, and
wherein the formatting module is configured to format, present, and output the current email threat report, from a first template of a plurality of report templates, that is outputted for a human user's consumption in a medium of any of 1) a printable report, 2) presented digitally on a user interface on a display screen, 3) in a machine readable format for further use in machine-learning reinforcement and refinement, and 4) any combination of the three.

2. The apparatus of claim 1, wherein the email protection system further has a gatherer module, an autonomous response module, an analyzer module, and the data store to cooperate with the autonomous email-report composer, where the gatherer module and the data store are configured to cooperate to store data points on an inbound email flow received over a period of time as well as one or more autonomous response actions performed by the autonomous response module on the inbound email flow, where the analyzer module is configured to cooperate with the one or more AI models trained with machine learning on the normal email pattern of life for entities in the email network to detect anomalous email, which is detected as outside the normal pattern of life for an entity of the email network, and/or suspicious emails that exhibit traits that suggest a malicious intent in order to determine an email attack's 1) purpose, 2) targeted group, and 3) any combination of both, and then cooperate with the autonomous email-report composer to populate in the email threat report the email attack's 1) purpose, 2) targeted group, and 3) any combination of both.

3. The apparatus of claim 2, wherein an analyzer module and the autonomous email-report composer are configured to cooperate with the data store to identify and supply a list of users in the email network that are at a most risk from emails over the period of time, where the autonomous email-report composer is configured to cooperate with the analyzer module, the one or more libraries of templates, and one or more AI models to compose at least a page in the current email threat report to represent the most at-risk users.

4. The apparatus of claim 1, wherein the autonomous email-report composer is configured to cooperate with an AI model trained on composing threat reports to compose the email threat report in the human-readable format with the natural language prose, terminology, and a prescribed level of detail on the cyber threats aimed at a selected target audience.

5. The apparatus of claim 1, wherein the autonomous email-report composer is configured to cooperate with the library of templates, where the first template for the email threat report comprises two or more sections, each section spans one or more pages in the email threat report, each section includes its own set of i) standard pre-written sentences written in the natural language prose in the one or more prewritten text templates, ii) visual representations, and iii) any combination of these, that are presented in each of those sections making up the email threat report.

6. The apparatus of claim 1, wherein the autonomous email-report composer is configured to cooperate with the data store and an autonomous response module to collect data points and compose an information needed to populate one more pages for an analysis of one or more specific autonomous response actions taken by the autonomous response module.

7. The apparatus of claim 1, wherein the autonomous email-report composer is configured to cooperate with an autonomous action module, the data store, and an AI model on cyber threats to list actionable actions to take in light of the cyber threats, and then to populate suggested actionable actions to take into the email threat report as well as generate a detailed explanation into one or more interesting email incidents for an individual write up which includes details about at least a targeted user of an email attack, one or more autonomous actions taken by an autonomous response module to remediate the email attack, and a textual discussion on incident triage with details of a resolution taken.

8. The apparatus of claim 1, wherein the autonomous email-report composer is configured to cooperate with the AI models trained with machine learning on the normal email pattern of life for entities in the email network in order to draw links between email incidents to identify trends between current users affected by the email incidents and then other users, who have a high similarity to the current users affected, who may be similarly targeted in a future,
where the autonomous email-report composer is then configured to generate a write up on the links between the current users affected by the email incidents and the highly similar users.

9. The apparatus of claim 1, wherein the autonomous email-report composer is configured to cooperate with the data store to represent complex metrics in a visually engaging way with the visual representations including i) graphs ii) contact links to a user, iii) pie charts, iv) bar charts, v) bubbles, and vi) any combination of these in one or more sections of the current email-threat report while also providing a textual analysis.

10. The apparatus of claim 1, wherein the autonomous email-report composer is configured to cooperate with the user interface to make the email threat report customizable for an end user to select what sections of the current email-threat report they want to appear in a presented and outputted email-threat report.

11. A method for an email protection system, comprising:
configuring an autonomous email-report composer to cooperate with one or more Artificial Intelligence (AI) models and modules of an email protection system and as a set of one or more libraries of sets of prewritten text and visual representations to populate on templates of pages in an email threat report, wherein each template comprises two or more sections, including i) standard pre-written sentences written in a natural language prose and ii) one or more visual representations;
configuring the autonomous email-report composer to compose the email threat report on cyber threats in a human-readable format with natural language prose, terminology, and level of detail on cyber threats aimed at a target audience, wherein the detail on the cyber threats includes a summary on different types of cyber threats occurring within an email network during a period of time covered by the email threat report; and
configuring the autonomous email-report composer to cooperate with the one or more libraries with prewritten text templates and visual representation templates with i) one or more standard pre-written sentences written in the natural language prose derived from previously generated email threat reports as well as ii) one or more of the prewritten text templates with fillable blanks that are populated with data for the cyber threats specific for a current email threat report composed of a summary on different types of cyber threats occurring within the email network during a period of time covered by the current email threat report along with a trend indicator that indicates whether one of the types of cyber threats has increased, decreased, or remained constant during the period of time, where the autonomous email-report composer is configured to cooperate with the one or more AI models trained with machine learning on a normal email pattern of life for entities in the email network and a data store to compose content in the current email threat report,
wherein the formatting module is configured to format, present, and output the current email threat report, from a first template of a plurality of report templates, that is outputted for a human user's consumption in a medium of any of 1) a printable report, 2) presented digitally on a user interface on a display screen, 3) in a machine readable format for further use in machine-learning reinforcement and refinement, and 4) any combination of the three.

12. The method of claim 11, further comprising:
configuring a gatherer module and the data store to cooperate to store data points on an inbound email flow received over a period of time as well as one or more autonomous response actions performed by an autonomous response module on the inbound email flow, and
configuring an analyzer module to cooperate with the one or more AI models trained with machine learning on the normal email pattern of life for entities in the email network to detect anomalous email, which is detected as outside the normal pattern of life for an entity of the email network, and/or suspicious emails that exhibit traits that suggest a malicious intent in order to determine an email attack's 1) purpose, 2) targeted group, and 3) any combination of both, and then cooperate with the autonomous email-report composer to populate in the email threat report the email attack's 1) purpose, 2) targeted group, and 3) any combination of both.

13. The method of claim 12, further comprising:
configuring an analyzer module and the autonomous email-report composer to cooperate with the data store to identify and supply a list of users in the email network that are at a most risk from emails over the period of time, where the autonomous email-report composer cooperates with the analyzer module, the one or more libraries of templates, and one or more AI models to compose at least a page in the current email threat report to represent the most at-risk users.

14. The method of claim 11, further comprising:
configuring the autonomous email-report composer to cooperate with an AI model trained on composing threat reports to compose the email threat report in the human-readable format with the natural language prose, terminology, and a prescribed level of detail on the cyber threats aimed at a selected target audience.

15. The method of claim 11, wherein the autonomous email-report composer is configured to cooperate with the library of templates, where the first template for the email threat report contains two or more sections in that template, each section spans one or more pages in the email threat report, each section can have its own set of i) standard pre-written sentences written in the natural language prose in the one or more prewritten text templates, ii) visual representations, and iii) any combination of these, that are presented in each of those sections making up the email threat report.

16. The method of claim 11, further comprising:
configuring the autonomous email-report composer to cooperate with the data store and an autonomous response module to collect data points and compose an information needed to populate one more pages for an analysis of one or more specific autonomous response actions taken by the autonomous response module.

17. The method of claim 11, further comprising:
configuring the autonomous email-report composer to cooperate with the user interface to make the current email threat report customizable for an end user to select what sections of the email-threat report they want to appear in a presented and outputted email-threat report.

18. The method of claim 11, further comprising:
configuring the autonomous email-report composer to cooperate with the AI models trained with machine learning on the normal email pattern of life for entities in the email network in order to draw links between email incidents to identify trends between current users affected by the email incidents and then other users, who have a high similarity to the current users affected, who may be similarly targeted in a future, where the autonomous email-report composer is then configured to generate a write up on the links between the current users affected by the email incidents and the highly similar users.

19. The method of claim 11, further comprising:
configuring the autonomous email-report composer to cooperate with the data store to represent complex metrics in a visually engaging way with the visual representations including i) graphs ii) contact links to a user, iii) pie charts, iv) bar charts, v) bubbles, and vi) any combination of these in one or more sections of the current email-threat report while also providing a textual analysis.

20. A non-transitory computer readable medium comprising computer readable code operable, when executed by one or more processing apparatuses in the email protection system to instruct a computing device to perform the method of claim 11.

* * * * *